United States Patent [19]
Shibata et al.

[11] Patent Number: 6,092,743
[45] Date of Patent: Jul. 25, 2000

[54] FUEL INJECTION VALVE

[75] Inventors: Koji Shibata, Hitachinaka; Yasuo Namaizawa, Kashima; Atsushi Sekine, Mito; Yuichi Sasaki, Hitachinaka; Tohru Ishikawa, Kitaibaraki, all of Japan

[73] Assignees: Hitachi, Ltd., Tokyo; Hitachi Car Engineering Co., Ltd., Hitachinaka, both of Japan

[21] Appl. No.: 09/199,456

[22] Filed: Nov. 25, 1998

[30] Foreign Application Priority Data

Nov. 26, 1997 [JP] Japan ..................................... 9-324450

[51] Int. Cl.$^7$ .................................................. F02M 61/00
[52] U.S. Cl. .................. 239/533.12; 239/533.2; 239/585.1; 239/585.4; 239/593; 239/900
[58] Field of Search ................................. 239/463, 533.2, 239/533.3, 533.9, 533.12, 585.1, 585.2, 585.4, 585.5, 591, 593, 597, 900; 123/294, 305, 470

[56] References Cited

U.S. PATENT DOCUMENTS

| | | | |
|---|---|---|---|
| 4,979,479 | 12/1990 | Furukawa | 239/533.12 X |
| 5,058,549 | 10/1991 | Hashimoto et al. | 239/533.12 X |
| 5,108,037 | 4/1992 | Okamoto et al. | 239/585.4 X |
| 5,533,482 | 7/1996 | Naitoh | 239/533.12 X |
| 5,878,962 | 3/1999 | Shen et al. | 239/533.9 |

FOREIGN PATENT DOCUMENTS

| | | |
|---|---|---|
| 3407545 | 9/1985 | Germany ........................... 239/533.12 |
| 5-33739 | 2/1993 | Japan . |
| 6-1221249 | 8/1994 | Japan . |
| 7-119584 | 5/1995 | Japan . |
| 8-296531 | 11/1996 | Japan . |

*Primary Examiner*—Andres Kashnikow
*Assistant Examiner*—Robin O. Evans
*Attorney, Agent, or Firm*—Evenson, McKeown, Edwards & Lenahan, P.L.L.C.

[57] ABSTRACT

A fuel swirling means 15 for giving a swirling force at the upper stream of the valve sheet 7 to the fuel passing through the surrounding area of the valve body 13 and a nozzle 16 injecting a swirling fuel are provided. A fuel spray 47 injected out from the injection port 17 of the nozzle 16 is so formed that the orientation of the fuel spray is deflected in a definite direction on the basis of the longitudinal axis C of the fuel injection valve body, the reachable distance L1 of the fuel spray at the deflected side is longer and the reachable distance L2 of the fuel spray at another side opposite to the deflected side is shorter.

4 Claims, 16 Drawing Sheets

(IGNITION PLUG SIDE)

(IGNITION PLUG SIDE)

(ENLARGEMENT OF F PORTION)

→ OFFSET SIDE

FUEL INJECTION VALVE

BACKGROUND OF THE INVENTION

The present invention relates to a fuel injection valve (injector) for the gas direct injection type engine in which fuel is injected directly into the cylinder of the engine.

As for the gasoline engine satisfying such social needs as high power, high fuel-efficiency and low pollution, engines using fuel injection valves of gas direct injection type (gas direct injection type gasoline engine) are remarked. Though the basic concept of this gasoline engine was born in many years ago, there have remained many problems to be solved such as high-pressure injection technology, pressure tightness and heat resistance in order to implement those engines for injecting fuels directly into the combustion chamber, however, the state-of-the-art in technology enables mass-production by today's advances in control technology and production technology, and thus, the individual auto makers go into the commercial-base production phase or into the R&D-base experimental manufacture phase.

The fuel injection valve of gas direct injection type is composed of a nozzle having a fuel injection port facing directly to the fuel chamber (the cylinder inside the engine), a valve body for opening and closing the fuel channel, a magnet coil for closing the valve body (for suction), a spring for closing the valve, and a yoke and a core for forming the magnetic circuit. In addition, a swirler (fuel swirling means) for providing the fuel at the upper stream of the valve sheet with a swirling force and a spring adjuster for adjusting the quantity of dynamic fuel injection are included.

A structure characteristic of this fuel injection valve of gas direct injection type includes that, as the fuel pressure reaches such a high value that 3 to 10 MPa in order to establish the grain refinement of the fuel spray liquid drop (for reducing the evaporation time) and the high efficiency in fuel injection (for reducing the fuel injection time), the pressure tightness and the oil tightness are enhanced in comparison with the fuel injection valve of conventional gas injection type with the fuel pressure being about 0.3 Mpa, and that the heat resistance and the gas tightness are enhanced because the nozzle is exposed directly to the combustion gas.

The characteristic and shape of the fuel spray injected out from the fuel injection valve is very important n the combustion operation in the gasoline engine of gas direct injection type. The engine combustion mode includes the homogeneous combustion and the stratified combustion, and those modes are shown in FIG. 8.

The homogeneous combustion is that the fuel injected during the intake stroke of the engine cycle, and that the fuel-air mixture in the combustion chamber is made to be homogenized with a theoretical air fuel ratio (A/F=15) through the compression stroke up to the ignition and combustion operation, which may increases the volumetric efficiency because the gasoline removes the latent heat of vaporization from the intake air and cools down the intake air, and may attain a higher output than the conventional port injection engine because the temperature of the combustion gas decreases. As it is required to diffuse the fuel wholly in the combustion chamber for establishing a uniform combustion with sprayed fuel, a wide and uniform fuel spray (mixed gas) is necessary, and therefore, it is preferable that the spray velocity is low so that fuel spray may not stick to the cylinder wall and the liquid membrane may not be developed. The uniform combustion mode is used for respecting the engine output when accelerated operations and high load operations.

A stratified combustion is such a combustion mode that a fuel is injected while a compression stroke, and the flammable mixed gas is concentrated around the ignition plug by means of air flows such as swirl and/or tumble flows and a cavity at the piston head, and an air layer is formed around the mixed gas and an extra lean burn is attained, which can increase the fuel efficiency remarkably. The stratified combustion mode is aimed for respecting the fuel efficiency, and is used when lower load and idle operations. It is preferable that the fuel spray at the stratified combustion mode is compact in order to concentrate the fuel spray around the ignition plug, and in case of the fuel spray when the fuel is highly pressurized because the spread of the fuel spray becomes smaller as the back pressure increases.

Conventionally, there are several alternative proposals for fuel injection valves in order to increase the aerification performance (fuel grain refinement) and the swirl performance.

For example, in Japanese Patent Application Laid-Open No. 8-296531 (1996), a swirler shaped in a hollow cylinder is placed at the lower part in the valve body, and a needle valve is inserted through the internal cylinder so as to be able to slide with the internal surface of the hollow cylinder, and a fuel injection chamber with its inner surface being tapered and its bottom surface being shaped in a spherical concave is formed at the down stream side of the valve sheet to which the needle valve contacts, and a injection port (fuel injection port=orifice) is formed so as to pass out through the center of the bottom face of the fuel injection chamber, and in addition, the orientation of the injection port is slanted to the axis (center line) of the valve body (fuel injection valve body) and a flat part is formed at the outside of the injection port so as to be at right angle to the injection port.

In Japanese Patent Application Laid-Open No. 7-119584 (1995), what is disclosed is that a swirl color (fuel swirling means) is placed so as to be located at the swirl nozzle (nozzle body) at the upper stream of the valve sheet, a suck hole shaped in a reverse cone is formed at the down stream of the valve sheet, an injection port (fuel injection port= orifice) is formed on the extension line from the suck hole, and that the center line of the suck hole and the center line of the injection port are identical to each other and those center lines are slanted to the axis of the swirl nozzle (fuel injection valve body). In this prior art, even in case of defining the inclination for the injection hole, the swirl reaches the injection hole as the rotational center of the swirl rotating on the plane orthogonal to the center line of the swirling flow traces on the linear locus along the center line of the injection hole. So far, the swirl loss in the suck hole becomes smaller and the swirl having a strong turning force is moved to the injection hole, by which the grain refinement of the fuel can be promoted as well as the spread of the spray in the combustion chamber becomes larger due to the increase in the spray angle, all of which ultimately leads to the increase in the efficiency of fuel combustion.

In case of in-cylinder injection type engine, the fuel injection valve body in the prior arts described above are generally located at the upper part of the cylinder, and by means that the fuel injection port are displaced toward the cavity of the piston head (at the opposite position to the ignition plug) from the longitudinal axis of the fuel injection valve body, and that the fuel is injected with deflecting toward the cavity, then the direction of the fuel spray is shifted to the ignition plug side by means of the shape of the cavity at the stratified combustion mode.

In Japanese Patent Application Laid-Open No. 5-33739 (1993), what is disclosed is that an air chamber is formed between the spray nozzle and the cover, the assist air from the air chamber is injected out into the swirl chamber in the tangential direction through the individual air injection hole, the fuel is directly injected from the injection hole into the engine cylinder as the injection fuel from the injection hole is forced to be swirled.

In Japanese Patent Application Laid-Open No. 6-221249 (1994), the injection angle of one of a couple of injectors placed in a single combustion chamber is made wider than the injection angle of the other of those injectors as well as the injector with a narrower injection angle is placed much closer to the ignition plug than the injector with a wider injection angle is, and that the injector with a narrower injection angle is used at a light-load operation and the injector with a wider injection angle is used at a high-load operation.

In the stratified combustion mode described above, it is important to concentrate the fuel spray around the ignition plug, and in the uniform combustion mode, it is important to spray the fuel uniformly and wholly in the cylinder, and furthermore, it is preferable to make smaller the grain size of the sprayed fuel mist commonly in the uniform combustion and the stratified combustion in order to reduce the time for vaporization. In addition, it is required to reduce the dispersion in the quantity of injected fuel.

In an internal combustion engine in which fuels are injected directly into the cylinder (the combustion chamber), the direction, shape, flow rate and flow velocity (the reachable distance of the fuel spray) of the fuel spray injected by the fuel injection valve influence much the concentration distribution of the mixed air in the combustion chamber at the ignition timing, and ultimately affect the engine performance.

SUMMARY OF THE INVENTION

According to the above consideration, in the combustion in the in-cylinder injection engine, it is required to establish the characteristics (the direction, shape, flow rate and flow velocity distribution of the fuel spray injected from the fuel injection valve in responsive to the requirements described above.

An object of the present invention is to provide a fuel injection valve for the in-cylinder injection type engine which establishes the fuel spray modes optimized individually for the stratified combustion mode and the uniform combustion mode with a single fuel injection valve, increases the gas mileage and the engine output and brings a stable engine performance in a wide range of engine rotations.

The principle invention proposed here in order to solve the above problems is as follows.

In a fuel injection valve for the in-cylinder injection type engine having a fuel swirling means for giving a swirling force at the upper stream of the valve sheet to the fuel passing through the surrounding area of the valve body and a nozzle injecting a swirling fuel, it is characterized by that a fuel spray injected out from the injection port of the nozzle is so formed that the orientation of the fuel spray is deflected in a definite direction on the basis of the longitudinal axis of the fuel injection valve body, the reachable distance of the fuel spray at the deflected side is longer and the reachable distance of the fuel spray at another side opposite to the deflected side is shorter.

According to the above structure, even in case that the fuel injection valve 1 is mounted at the upper part of the cylinder 40 as shown in FIG. 6A with such an angle that the longitudinal axis C of the fuel injection valve body intersects the longitudinal axis A of the cylinder (this intersection includes three-dimensional or two-dimensional geometry), in other words, even in case that the fuel injection valve 1 is mounted with an angle with respect to the plane B vertical to the longitudinal axis A of the cylinder, it is enabled to make the fuel spray directly injected into the cylinder 40 deflected toward the ignition plug 41 with respect to the longitudinal axis C of the fuel injection valve body. In addition to the deflected spray toward the ignition plug as described above, it is enabled to make the reachable distance L1 of the spray deflected toward the ignition plug larger and make the reachable distance L2 of the spray on the opposite side of the deflected spray shorter.

According to such a deflected fuel spray, the degree with which the fuel spray is concentrated directly around the ignition plug at the stratified combustion mode. As the fuel injection at the stratified combustion mode is performed at the compression stroke in which the engine combustion chamber (inside the cylinder) is highly pressurized, the spread of the fuel spray tends to become smaller. Though this tendency in the narrower spread of the fuel spray is inevitable for establishing a compact region for forming a mixed air, if the spread of the fuel spray becomes too narrow, a good conditioned region for forming a mixed air can not be obtained. As it is possible in the present invention to extend the fuel spray area and then expand the spray angle in proportion to the deflection of the spray direction toward the ignition plug, it can be avoided that the spread of the fuel spray becomes so narrower than required and then, a compact fuel spray can be obtained for concentrating the fuel spray properly around the ignition pug. Though the fuel injection is performed at the intake stroke at the uniform combustion mode when the inside pressure of the cylinder is lower and a spread fuel spray can be obtained, it is enabled to extend the fuel spray area (fuel spray angle) more than ever before in proportion to the deflected spray direction toward the ignition plug and to increase the uniformity of the fuel in the cylinder.

Even in case that the angle $\beta 1$ of the desired spray direction ($\beta 1$ is an angle defined between the plane B perpendicular to the longitudinal axis A of the cylinder and the center line D of the fuel spray as shown in FIG. 7) can not be realized due to the restriction for the engine mount angle only by the engine mount angle $\beta 2$ of the fuel injection valve 1 ($\beta 2$ is an angle defined between the plane B perpendicular to the longitudinal axis A of the cylinder and the center line C of the fuel injection valve body as shown in FIG. 7), as the fuel spray is deflected toward the ignition plug with respect to the longitudinal axis C of the fuel injection valve body, the angle $\beta 1$ of the desired spray direction can be obtained by using the spray deflection angle $\beta 3$ and the fuel injection valve mount angle $\beta 2$.

In addition to the deflected spray toward the ignition plug, in case that the reachable distance L1 of the spray deflected toward the ignition plug is made to be longer and the reachable distance L2 of the spray on the opposite side of the deflected spray is made to be shorter, the spray corresponding to L1 for the longer reachable distance gets to a fast component for establishing higher ignition performance, and the spray corresponding to L2 for the shorter reachable distance contributes to the prevention of attaching onto the piston head due to the short range of spray gets to a low velocity component for suppressing the unburned combustible and reducing the soot and smoke exhaust.

According to the above operations, an extra lean burn required for the stratified combustion can be realized, and an output power improvement and lower smoke exhaust required for the uniform combustion mode can be realized.

In case that the desired spray direction of the fuel injection valve and its mount angle are matched each other, the deflected spray is not required, but in this case, the injection port of the nozzle is not made to be deflected but it is allowed to adjust the fuel spray to be injected so that the reachable distance of the spray around the ignition plug may be longer and the reachable distance of the spray on the opposite side of the deflected spray may be shorter.

(2) And furthermore, as for preferred embodiments of the fuel injection valve good for the in-cylinder injection type gasoline engine, the fuel injection valve described in the claims from 2 onward is proposed. This is described in the preferred embodiments by referring to examples.

DETAILED DESCRIPTION OF THE PREFERRED EMBODIMENTS

Figure 1:
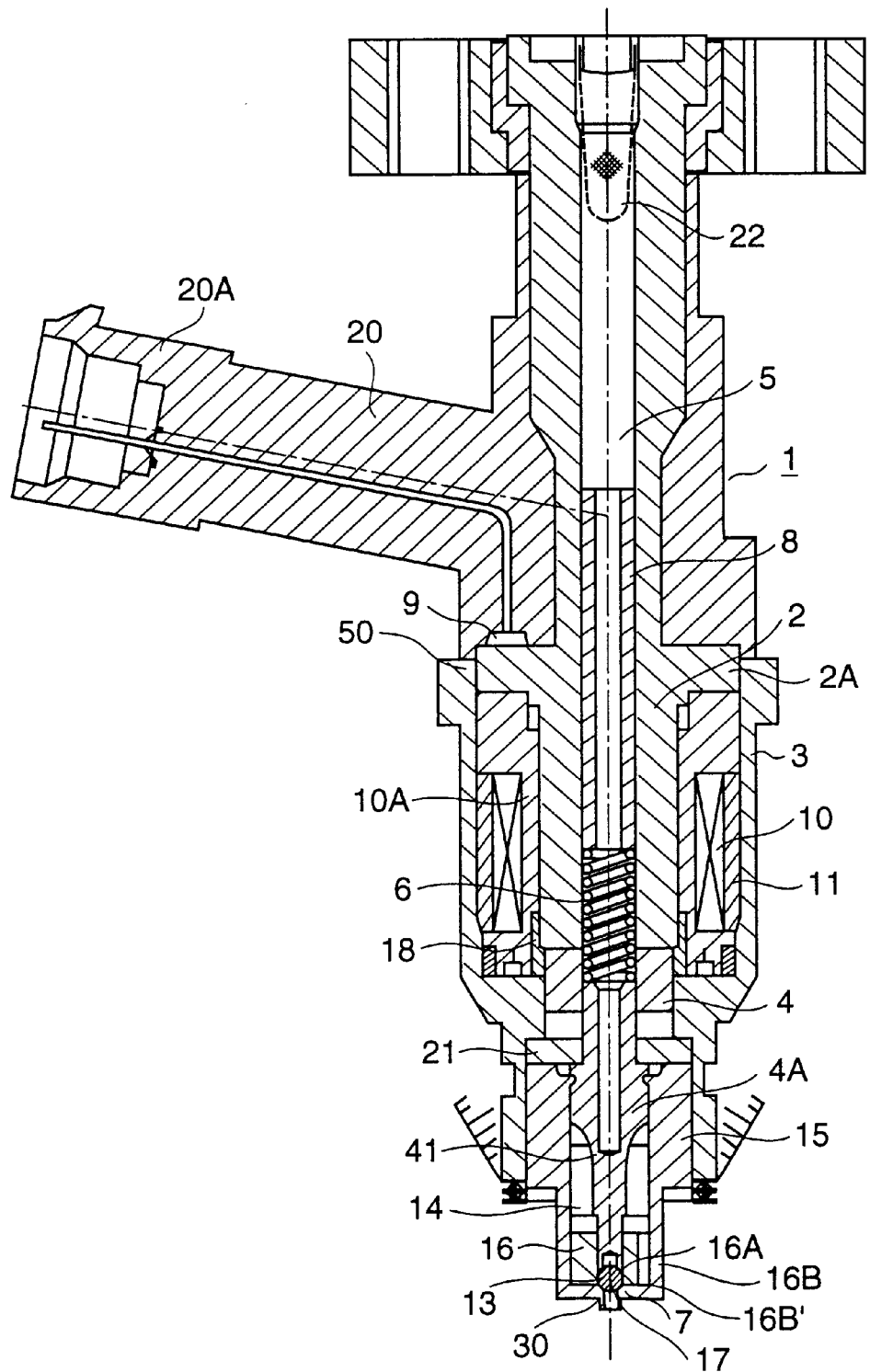
FIG. 1 is a vertical cross-section view showing an example of the fuel injection valve in the present invention.

Preferred embodiments of the present invention will be described by referring to the drawings.

Figure 2:
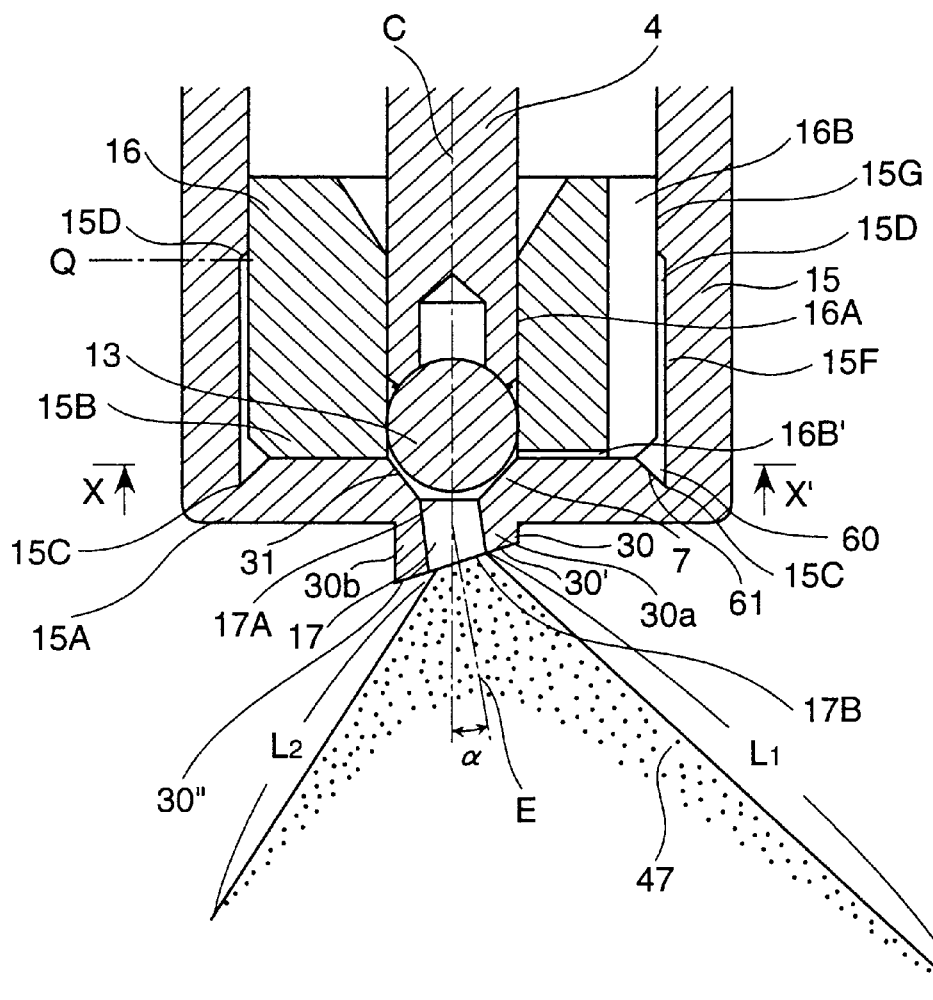
FIG. 2 is an explanatory drawing showing a surrounding area of the nozzle part of the fuel injection valve shown in FIG. 1.
Figure 3A:
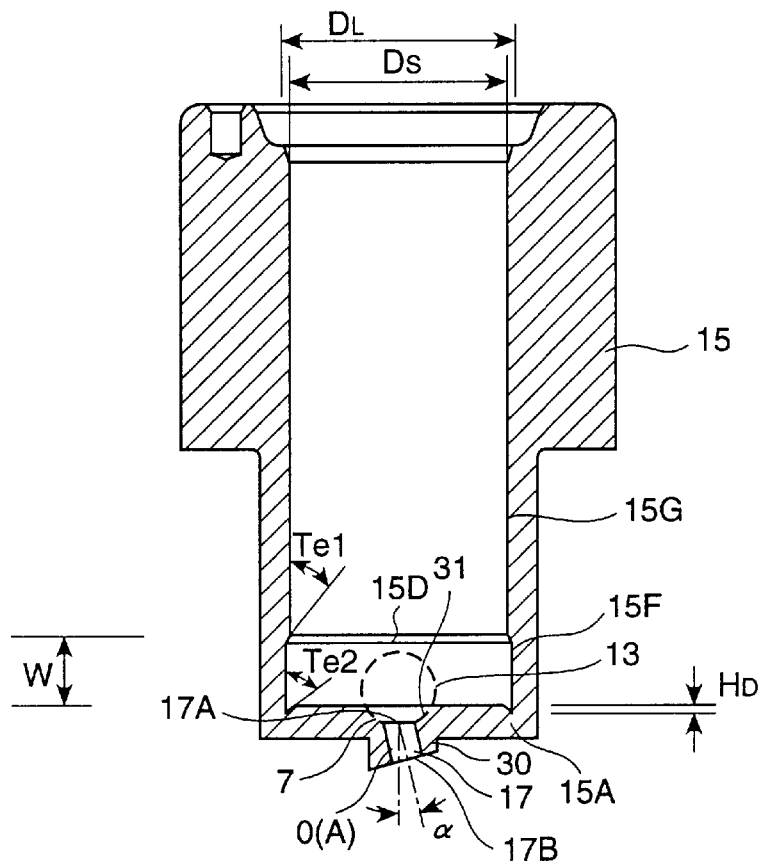
FIG. 3A is a vertical cross-section view showing a single body itself of the nozzle used in the above fuel injection valve.
Figure 3B:
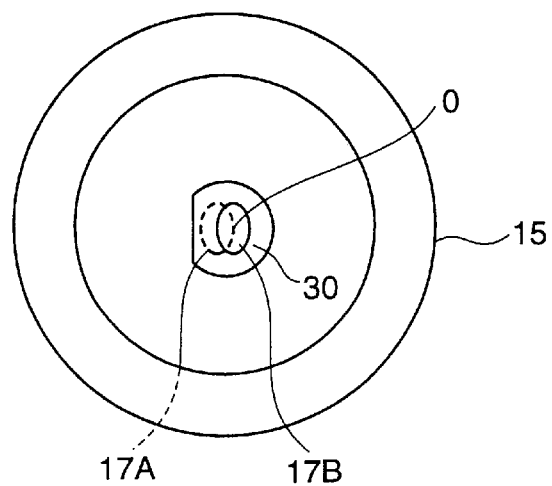
FIG. 3B is its bottom face drawing.
Figure 4:
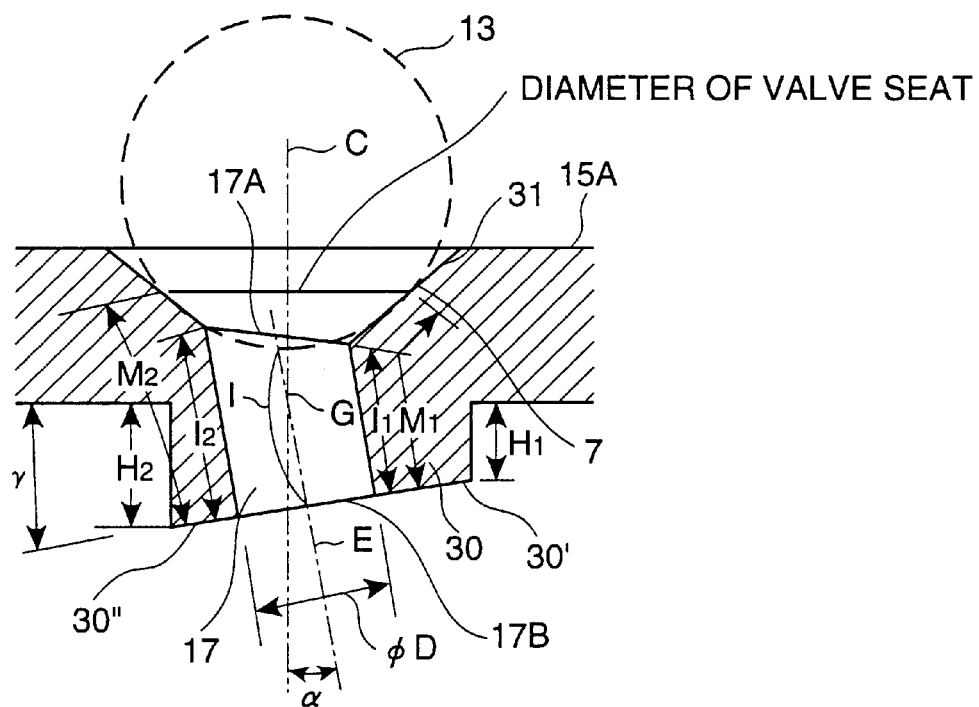
FIG. 4 is a magnified cross-section view of the important part of FIG. 3A.
Figure 5:
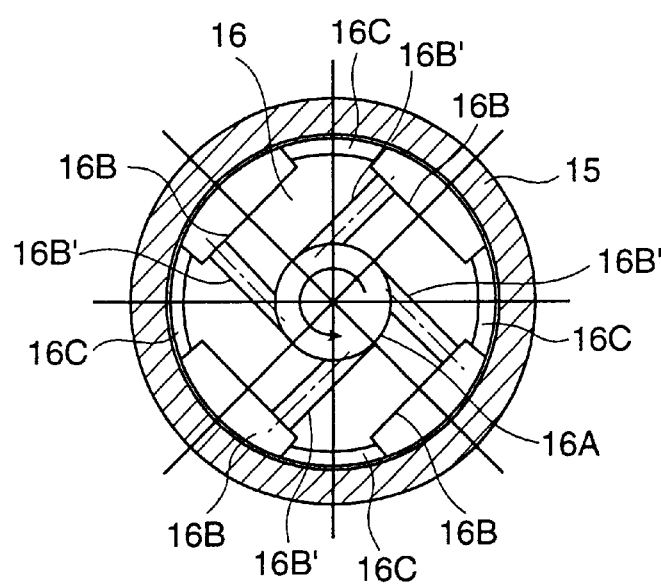
FIG. 5 is a projected drawing viewed at X–X' line of FIG. 2.

Related to one embodiment of the present invention, FIG. 1 is a vertical cross-section view of the fuel injection valve used in the in-cylinder type engine (gasoline engine), FIG. 2 is an explanatory drawing showing the injection state of the fuel spray as a magnified view of the nozzle part in FIG. 1, FIG. 3A is a vertical cross-section view of the nozzle body used in the fuel injection valve shown in FIG. 1, FIG. 3B is a bottom view of the nozzle body, FIG. 4 is a partially magnified view showing the valve sheet part and the neighborhood of the fuel injection port shown in FIG. 3A, and FIG. 5 is a horizontal cross-section view of the swirl orifice provided inside the nozzle body viewed from the line X–X' in FIG. 2.

The fuel injection valve 1 shown in FIG. 1 is an example of the fuel injection valve using a magnet coil used as an actuator. As magnetic circuit components for the actuator, a fixed core 2, yoke (case) 3 and a movable core (plunger) 4 are provided.

The fixed core 2 is an elongated hollow cylinder and has a flange 2A in its axis direction, and the lower half below the flange 2A is inserted in the yoke 3. The flange 2A is engaged in the open port at the upper part of the yoke 3, and by pressuring the marginal part of the open port at the upper part of the yoke 3 and establishing a plastic flow as shown by the symbol 50, the fixed core 2 an the yoke 3 are bonded plastically. This bondage may be realized by applying fastening forces. A terminal 9 of the magnetic coil 10 is provided at the flange 2A.

Inside the fixed core 2, a fuel channel 5 is formed so as to penetrate through the fixed core 2 in the axial direction, and a return spring 6 of the movable core 4 is inserted at one end of the fuel channel 5 (the end part opposite to the fuel flow-in part), and the movable core 4 is energized by the return spring in the valve-close direction (toward the valve sheet 7). In side the fixed core 3, a hollow spring adjuster 8 is provided for adjusting the spring force of the return spring 6, and the inside of the adjuster 8 forms a part of the fuel channel 5.

The magnetic coil 10 is covered by molded resin, and a part of the fixed core 2 is inserted and fixed inside the bobbin 10A of the magnetic coil, and the magnetic coil 10 is provided inside the cylindrical yoke 3 as well as a part of the fixed core 2. The molded resin 11 protects the magnetic coil 10 and prevents the leak current. A component 18 is a seal ring for preventing the fuel from flowing into the coil assembly.

An electric signal for driving the magnetic coil 10 is applied to the magnetic coil 10 through the terminal 9. The terminal 9 is buried inside the molded resin body placed above the yoke 4, and its one end is located at the connector part 20A and thus, forms the connector terminal.

A hollow cylindrical nozzle with a bottom (nozzle body) is fixed at the bottom part of the yoke 3. An orifice 17 used as the valve sheet 7 and the fuel injection port is provided at the bottom part of the nozzle 15, and a fuel swirling element (hereinafter referred also to a swirler) supported by the internal bottom of the nozzle is placed in the nozzle 15. The swirler 16 is located at the upper stream of the valve sheet 7.

A guide hole (center hole) for the ball valve (valve body) is placed at the center of the swirler 16, and fuel channels 16B and 16B' for communicating between the fuel channel 14 inside the nozzle 15 and the guide hole 16A are formed at the peripheral and bottom parts of the swirler 16.

FIG. 5 shows a projected view of the swirler 16 viewed at its bottom part and viewed from the line X–X', and the swirler 16 is composed of four circular arcs 16C segmented individually by 90 around its periphery and gaps between the adjacent circular arcs (fuel channels), and the circular arc 16C contact the inside surface of the nozzle and the open side of the gap 16B is covered by the internal surface of the nozzle 15 and thus forms the fuel channel, and by means of configuring the direction of channels so as to be eccentric with respect to the center of the swirler, the swirling force is applied to the fuel while the fuel flows through the fuel channels 16B and 16B'. Thus, a swirling force is applied to the fuel flowing out from the fuel channel 16B' and passing through the surrounding area of the valve body 13 at the upper stream of the valve sheet 7.

The movable core 4 is connected to the hollow plunger rod 4A with a ball valve 13 fixed at its head. A fuel passage hole 41 is placed on the side wall of the plunger rod 4A. A component 21 is a stopper for limiting the stroke of the movable core 4 in its open direction.

The fixed core, the yoke 3 and the movable core 4 are composed of magnetic materials, and the rod part 4A, the ball valve 13, the stopper 21 and the spring adjuster 8 are composed of non-magnetic materials.

When the magnetic coil is not at current-carrying state, the ball valve 13 receives the spring force applied by the return spring 6 and the fuel pressure and contacts the sheet valve, and then, keep the valve opening state.

When the electric signal is applied to the magnetic coil and the magnetic coil gets to the current-carrying state, a magnetic circuit is formed by the fixed core 2, the yoke 3 and the movable core 4, and the movable core 4 is magnetically attracted to the fixed core 2. The ball valve 13 as well as the movable core 4 are also guided and moved to the internal face of the swirler 16, and leave the valve sheet 17 and gets into the valve opening state.

At the valve opening state, the fuel flows through the piping apparatus such as fuel pump, fuel pressure regulator and accumulator, and then passes through the fuel channel 5, the filter 22 and the inside of the movable core 4, each placed in the fixed core 2 and through the internal channel, the fuel passage hole 41, the passage 14 in the nozzle (nozzle body) 15, and is injected directed into the inside of the cylinder of the engine thorough the orifice 17 while provided with the swirling force by the swirler and swirling at the tapered hole having the valve sheet 7.

By referring to FIGS. 2 to 4, the structure of the nozzle is described.

The orifice used as the injection port 17 of the fuel and the diameter-extended hole 31 with its diameter extended at the entrance 17A of he injection port 17 toward the upper stream which accepts a part of the ball valve 13 and has the valve sheet 7 are formed at the central part of the bottom wall 15A of the nozzle 15 having a bottom and shaped in a hollow cylinder. Though the diameter-extended hole 31 is structured as a reverse cone in this example, it is allowed to make its shape partially a curved surface.

The orifice forming the injection port 17 is slanted with respect to the longitudinal axis C of the fuel injection valve body, and its tilted angle (deflection angle) α is so determined as to be between 5° and 10° with respect to the longitudinal axis C of the fuel injection valve body.

By providing the injection port 17 with a deflection angle α, the fuel spray 47 injected out from the fuel injection valve 1 (in other word, the center line of the fuel spray) is deflected in a uniform direction (the direction in which the injection port 17 is deflected in terms of the view of the injection port 17 from the valve sheet 7) with respect to the longitudinal axis C of the fuel injection valve body.

The marginal part of the outlet of the injection port 17 of the nozzle 15 is formed by a small raised part 30 to be described later in this embodiment, and the marginal part of the outlet 30 and the outlet 17B of the injection port provide a slant and non-perpendicular face with respect to the longitudinal axis C of the fuel injection valve body. In this embodiment, as shown in FIG. 4, as for the marginal part of the outlet 30, the slant face 30" extended out from the face of the outlet 15B of the injection port toward the injection direction is defined as a slant face upstream side, and the slant face 30' extended back from the face of the outlet 15B of the injection port toward the opposite direction to the injection direction is defined as a slant face down stream side. By cutting the outlet 17B of the injection port in a slant face, the length of the injection port 17 becomes at least axial asymmetry. As the angle defined between the slant face of the outlet 17B of the injection port and the center line E of the injection port is made to be 90° in this embodiment, the shape of the outlet 17B of the injection port is a complete round, and the edge angle of the outlet 17B is axis symmetry. If the angle defined between the slant face of the outlet 17B of the injection port and the center line E of the injection port is not perpendicular (≠90), he shape of the outlet 17B and its edge angle is axis asymmetry, and thus, a desired shape of the outlet of the injection port can be obtained by modifying the slant face angle of the outlet 17B.

So far, by cutting the outlet 17B of the injection port in a slant face, what can be obtained is such a spray pattern that the fuel spray of the swirling fuel becomes a cone shape as shown in FIG. 2, and the reachable distance L1 of the spray and the quantity of the spray for the slant face down stream side 30' of the marginal part of the outlet 30 is larger, and that the reachable distance L2 of the spray for the slant face upper stream side 30", that is, L1>L2. It is proved that the quantity and distribution of the fuel spray for L1 is larger and the quantity and distribution of the fuel spray for L2 is smaller.

One of its reasons can be assumed as follows. As shown in FIG. 4, by making the cutting face of the outlet 17B of the injection port 17 and the marginal face 30 of the outlet shaped in a slant face, the length of the injection port 17 is axial asymmetry, and consequently, as for the orifice length 1 of the injection port 17, the orifice wall face length 12 for the slant face upper stream side 30" of the marginal part of the outlet 30 and the orifice wall length 11 for he slant face down stream side 30' have such a relation as 12>11, and as for he channel length M from the contact position of the valve body 31 of the valve sheet 7 and the outlet 17B of the injection port, the length M2 for the slant face upper stream side 30" of the marginal part of the outlet 30 and the:length M1 for the slant face down stream side 30' of the marginal part of the outlet 30 have such a relation that M2>M1, and thus, as the channel length of the swirling flow changes for the individual positions, a difference in the influence by the channel wall such as pressure loss occurs. In this case, the loss for the side having the longer channel length M (M2) is larger and the reachable distance (the reachable distance L2 of the spray)of the spray at the M2 side (spray penetration and flow velocity) is also small, and in contrast, the loss for the side having the shorter channel length M (M1) is smaller and the reachable distance of the spray at the M side (the reachable distance L1 of the spray) is longer. In addition to the reachable distance of the spray (spray velocity), the flow rate distribution of the fuel spray can be made to have directional dependency (that is, it is enabled to define such the flow rate distribution that the fuel spray quantity at the M1 side is larger than the fuel spray quantity at the M2 side). As for the other factors which provides the directional dependency with the reachable distance of the spray (flow velocity distribution) and the spray flow rate distribution, what can be proposed include that the shape of the spray outlet is adjusted in responsive to the gradient of the slant face of the marginal part of the outlet, and that the edge angle and the shape of the inlet 17A of the injection port is adjusted for respecting the slant angle defined at the injection port.

In the fuel injection valve of this, the fuel spray 47 injected from the injection port 17 of the nozzle 15 may be deflected in a definite direction with respect to the longitudinal axis C of the fuel injection valve body, and the spray shape is so defined that the reachable distance L1 of the spray at the deflected side may be larger and the reachable distance L2 of the fuel spray at another side opposite to the deflected side may be shorter.

In this embodiment, the above described marginal part of the outlet is established as follows.

A small raised part 30 with its height shorter than the length of the orifice 1 of the injection port 17 is formed at the center of the external face of the bottom part of the nozzle 15 having the injection port 17, and the injection port 17 has a inclination with respect to the longitudinal axis of the fuel injection valve body and its outlet 17B is formed at the small raised part 30. With this structure, the small raised part 30 defines a wall part of the marginal part of the outlet of the injection port 17. The top face of the small raised part (the marginal part of the outlet) 30 provides such a slant face as the deflected direction side of its injection port is made lower and its non-deflected direction side is made higher in view of the outlet 17B of the injection port from the valve sheet 7.

The ball valve 13, the diameter (the diameter of the part to which the valve body contacts) of the valve sheet, the angle of the valve sheet, the orifice (injection port) 17 and the small raised part 30 have the following specifications. For example, the diameter of the pipe of the ball valve is 2 mm, the diameter of the valve sheet (the diameter of the sheet to which the valve body contacts) is 1.4 mm, the angle of the valve sheet is 90°, the diameter of the orifice is from 0.6 mm to 0.9 mm, the length of the orifice (the length along the center axis of the orifice) is 0.3 to 1.3 times of the diameter of the orifice, the diameter of the small raised part is from 2 to 3 mm, the height H2 of the slant upward wall part at the marginal part of the outlet of the orifice is from 0.43 to 0.8 mm, and the height Hi of the slant downward wall part is from 0.1 to 0.46 mm. The gradient of the slant $\gamma$ is from 5° to 10° (8.5° in this case).

As shown in FIG. 3B drawing the bottom face of the nozzle body, the small raised part 30 in this embodiment is composed of an outline enclosed by a circular arc with its face perpendicular to the center line of the small raised part larger than a semi-circumference and a chord connected between its both ends. The height of the small raised part 30 at the chord side is made to be higher and the height of the small raised part 30 at the opposite side to the chord side, and thus, the top face of the small raised part is made to be a slant face. The injection port 17 is so weathered that the side of the inlet 17A of the injection port may be deflected toward the chord side with respect to the center line O of the small raised part, and that the side of the outlet 17B of the injection port is deflected toward the opposite side of the chord.

As described above, by means that the outline of the small raised part 30 is composed of the arc and the chord, and that the gradient of the injection port 17 and the direction of the slant face of the top face of the small raised part are made to be matched with the arc and the chord, it is enabled that the deflection direction of the fuel spray of the fuel injection valve can be recognized by referring to the arc and the chord.

As shown in FIGS. 2 and 4, though the injection port 17 (the center line E of the injection port) is formed so as to have an inclination with respect to the longitudinal axis C of the fuel injection valve body, the intersecting point G of the longitudinal axis C of the fuel injection valve body and the center line E is located inside the orifice forming the injection port 17.

In such a manner that the intersecting point G is made to be located inside the injection port 17, as shown in FIG. 4, the edge angle of the inlet 17A of the fuel injection port 17 becomes axial asymmetry with respect to the center line of the valve sheet 7 diameter (the center line of the valve sheet diameters matches to the canter line of the longitudinal axis C of the fuel injection valve body). It is assumed that the axial asymmetry of the inlet 17A of the injection port influences the fuel spray state.

It is so defined that the valve body 13 contacting the valve sheet 7 when the valve opens is shaped in a sphere, and that the top of the sphere of the valve body 13 is located below the inlet 17A of the injection port and gets into the inside of the injection port 17 when the valve is closed. It is allowed that the top of the valve may be located at the same level of the inlet 17A of the injection port when the valve is closed.

With such a structure as described above, it is appreciated that the dead volume (free space) between the top face of the valve body 13 and the inlet 17A of the injection port when the valve opens can be reduced and that the fuel can be sprayed with attenuation of the swirling force of the swirling fuel kept as little as possible. As a result of increasing the swirling force for the fuel spray, the fuel spray can be formed to be shaped in a cone which provides a high-density outside area having larger swirling energy and a coarse density inside area having lower swirling energy, and then, it is appreciated that the swirling energy can be used effectively and the grain refinement of the fuel spray can be achieved with such a shape as described above. By means that the dead volume wall on which the residual fuel tends to attach is reduced as much as possible when the valve is closed, it is aimed to make the residual fuel kept from staying, and consequently increase the accuracy of the fuel air ratio.

As a result of experiments, it is proved that an effect provided by the reduction of the dead volume and an increase in the swirling energy can be obtained by satisfying the following relational expression without making the top face of the ball valve positioned at the same level as the inlet 17A of the fuel injection port or got into the fuel injection port.

Figure 9:
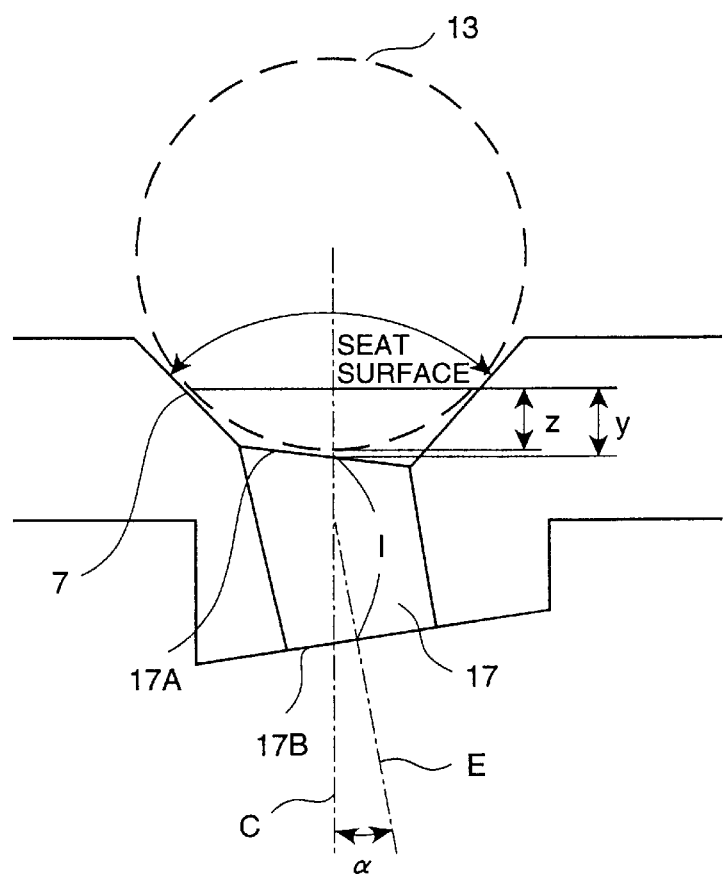
FIG. 9 is an explanatory drawing between the distance y from the valve sheet to the inlet of the fuel injection port and the distance z from the valve sheet to the top of the valve body.
Figure 8:
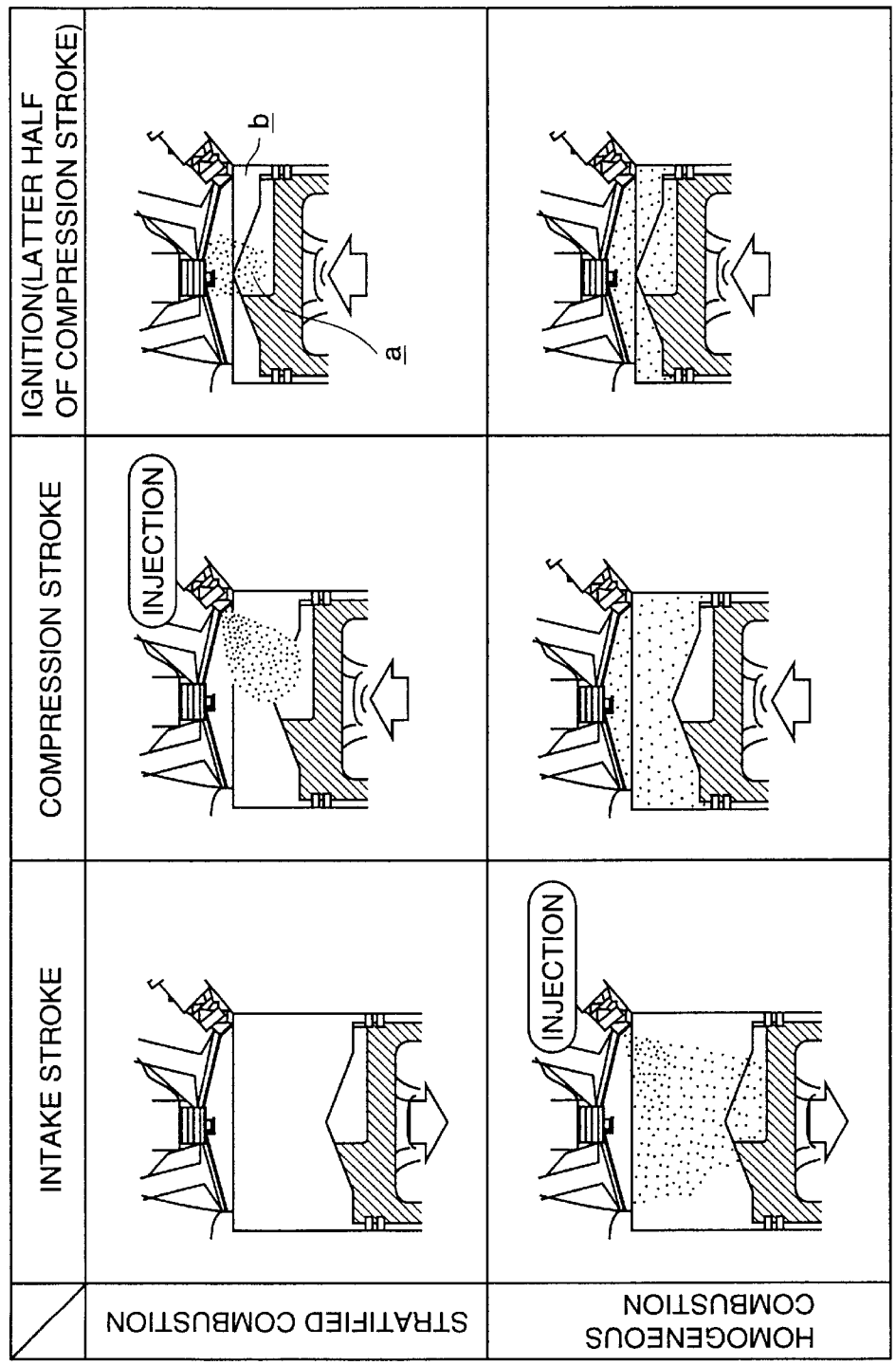
FIG. 8 is an explanatory drawing of the * combustion mode and the uniform combustion mode.

As shown in FIG. 9, assuming that the top of the valve body 13 contacting to the valve sheet when the valve is closed faces to the inlet 1A of the injection port 17 at the down stream of the valve sheet 7, and that the distance from the position at which the valve 13 contacts the valve sheet 7 to the inlet 17A of the injection port is defined as y, and the distance from the position at which the valve 13 contacts the valve sheet 7 to the inlet 17A of the injection port and the top of the valve body is defined as z, the condition to be required is $y \leq 2z$.

Assuming that the length of the injection port 17 is defined as 1 (the length 1 is the length of the orifice on the central axis of the injection port) and the diameter of the injection port is defined as d, those parameters are determined so as to satisfy the relational expression $0.3<l/d<1.3$. The reason why the lower bound of l/d is determined to be 0.3 is that the desired deflected angle for the fuel spray can not be obtained for the value lower than this lower bound, and the pressure loss and the grain size of the spray glow larger for the value larger than 1.3 and the required grain size (100 $\mu$m) can not be attained.

As shown by arrows in FIG. 5, the swirling direction of the fuel in this embodiment is counter clockwise viewed from the down stream side of the valve sheet, but clockwise viewed from the upper stream side of the valve sheet The reason is that it is experienced that a more preferable deflected spray can be obtained by making the swirling fuel oriented rather than using the swirling direction opposite to this orientation, in case that slant faces are provided at the outlet 17B and the top face of the marginal part 30 of the injection port 17, and that the injection port 17 is provided with a gradient so that the inlet 17A of the injection port 17 may be deflected toward the slant face upper stream side 30" of the marginal part of the outlet with respect to the central axis C of the valve sheet and that the outlet 17B may be deflected toward the slant face down stream side 30' of the marginal part of the outlet.

As described earlier, the nozzle 15 shaped in a hollow cylinder having a bottom includes a chip used as a swirler 16 as shown in FIG. 2, and the chip 16 has a guide hole 16A for the ball valve (valve body) 13 at its center, and eccentric fuel channels 16B and 16B' at its outer face and bottom face. The diameter of the inner surface of the nozzle is enlarged at the region from the corner 15C intersecting the inner bottom face 15B of the nozzle to the inside perimeter position 25D intersecting the vertical face Q of the chip axis at the middle point in the height of the chip 16, and a hollow 60 is formed at the corner 15C intersecting the inner bottom face of the nozzle 15 positioned below the face 15B accepting the chip of the nozzle inner bottom in the region of the inner enlarged perimeter 15F.

According to the above structure, the position on the inner surface of the nozzle in which the chip 16 is provided is composed of inner surfaces having different inner diameters, and the inner surface 15G with smaller inner diameter is located upstream of the inner surface 15F with larger inner diameter and contacts the non-fuel channel face (circular arc face 16C shown in FIG. 5) on the outer face of the chip 16, On the other hand, the inner surface 15F with larger inner diameter is formed at the region from the corer 15C intersecting with the inner bottom face of the nozzle to the inner surface position 15D intersecting with the vertical face Q of the chip axis at the mid-point of the height of the chip. The hollow 60 in which the corner 15C is located is formed by the intersection between the taper 61 formed at the marginal part of the inner bottom face and the inner surface 15F with larger inner diameter. The boundary part 15D between the inner surfaces 15G and 15F with their own distinctive inner diameters is formed by a taper. In this embodiment, as an example, as shown in FIG. 3A, the inner diameter DS of the nozzle inner surface 15G with smaller inner diameter is determined to be $\Phi$5.9 mm, the inner diameter DL of the nozzle inner surface 15F with larger inner diameter is determined to be $\Phi$6.2 mm, the taper angle $T_{\theta 1}$ of the inner diameter difference boundary position 15D is determined to be 30 with respect to the nozzle inner surface, the taper angle $T_{\theta 2}$ forming a hollow 60 is determined to be 60 with respect to the nozzle inner surface, the depth HD is determined to be 0.26 mm with respect to the nozzle inner surface, the width W of the channel of the enlarged inner surface 15F is determined to be 3 mm. The width of the channel of the fuel channel 16B' of the swirler 16 is 0.4 m and the height of the channel is 0.19 mm.

By forming an inner surface part (inner surface channel) 15F with its diameter enlarged and by defining a corner 15C at the hollow 16, the following operation and effect can be obtained.

Figure 18:
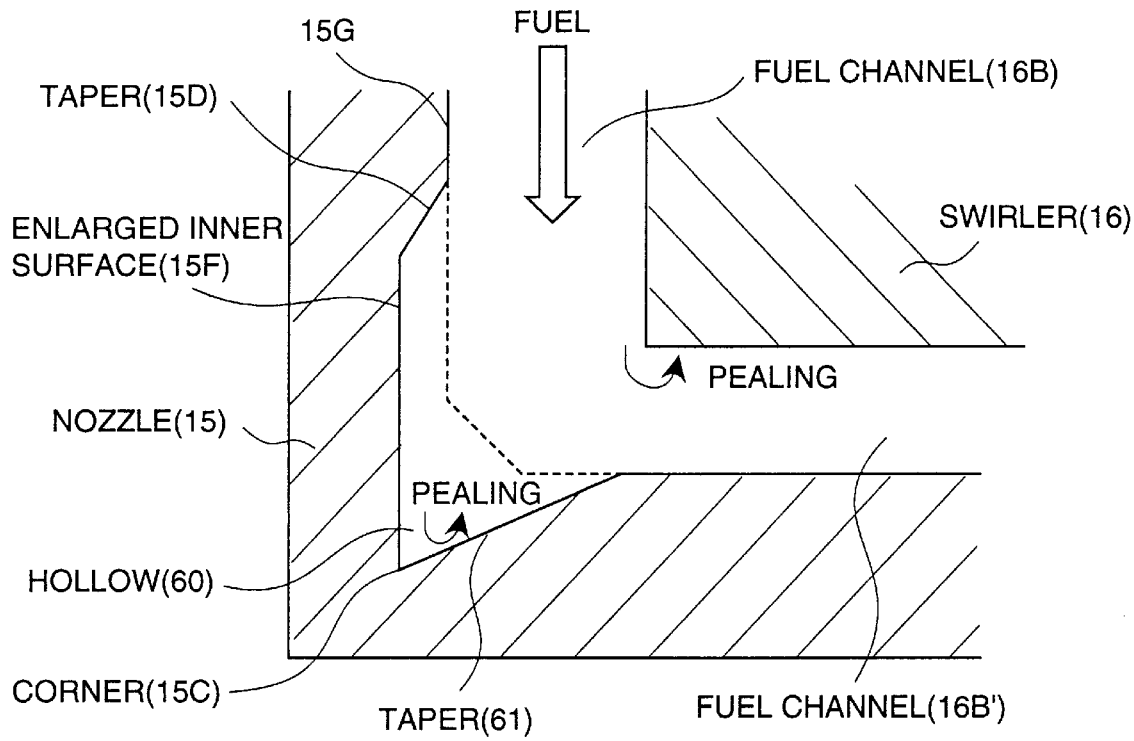
FIG. 18 is an explanatory drawing showing the behavior of the fuel flow in the nozzle with swirls in the present invention.
Figure 19:
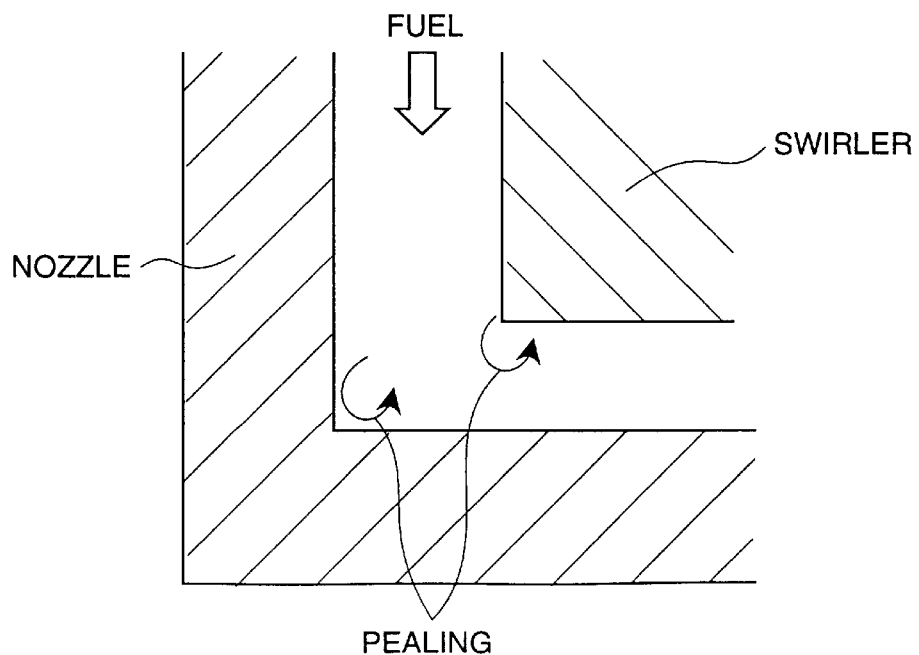
FIG. 19 is an explanatory drawing showing the behavior of the fuel flow in the nozzle with swirls in the prior art

In the case of the prior art, as there is no such an inner surface 15F with its diameter enlarged as shown in FIG. 19, the fuel channel of the swirler is shaped in a simple elbow, and an intensive fuel pealing occurs at the corner of this channel structure, which causes an increase in the pressure loss in the fuel channel. In contrast, in case of the apparatus of this embodiment, as shown in FIG. 18, the enlarged inner surface 15F contributes to an extension of the fuel channel near the corner C and a reduction of the flow velocity, and then, a reduction of the pressure loss due to the fuel pealing. It should be noted that, as the fuel channel is narrowed down after the fuel passes through the corner 14C, the flow velocity increases again. By means that the tapers 15D and 61 are formed at the inlet and outlet of the enlarged inner surface 15F of the nozzle, the occurrence of the spreading loss and convergent loss in the fuel channel is suppressed as much as possible.

So far, with the above described nozzle inner surface structure, an increase in the swirling energy of the fuel spray and ultimately the grain refinement of the fuel can be facilitated.

By means that the outer surface of the bottom part of the nozzle is polished and formed as non-perpendicular surface with respect to the longitudinal axis C of the fuel injection valve body, it is considered that the smoke and fuel is kept from attached on the inner surface.

Figure 6A:
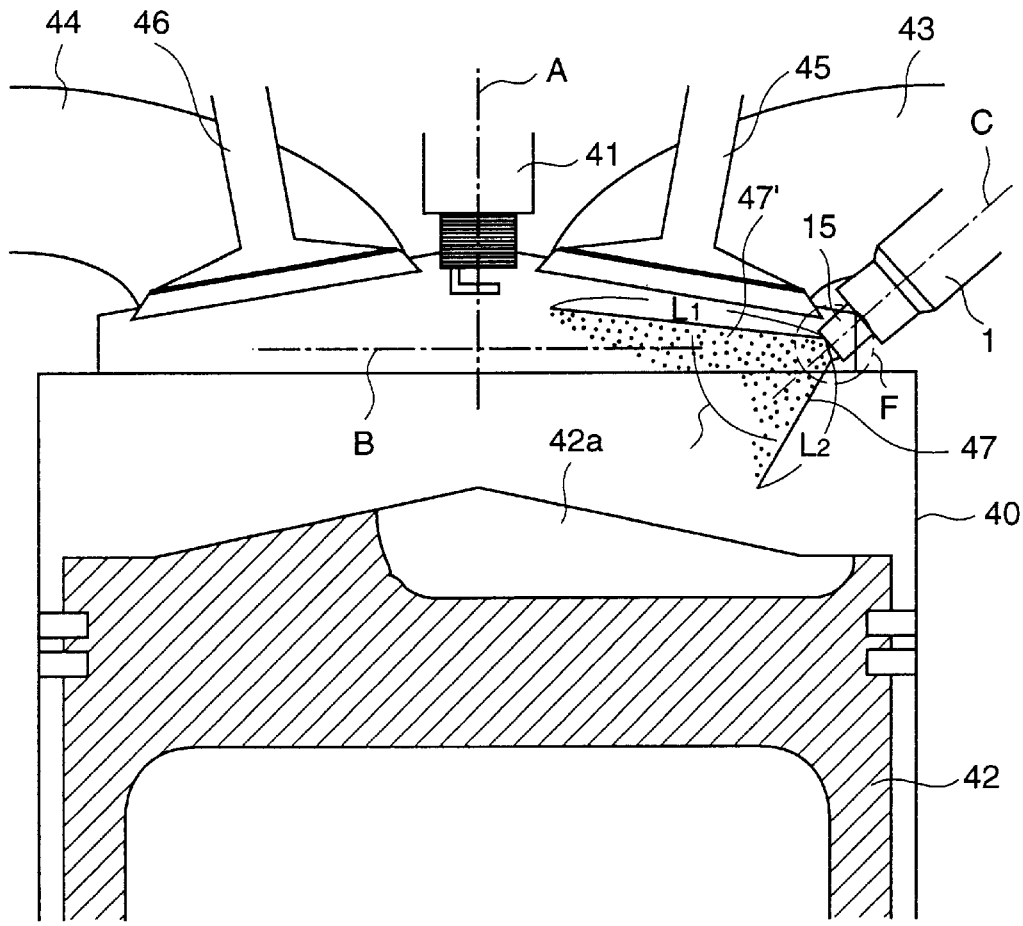
FIG. 6A is an explanatory drawing showing an example of applying the fuel injection valve of the present invention to the in-cylinder injection type gasoline engine.
Figure 6B:
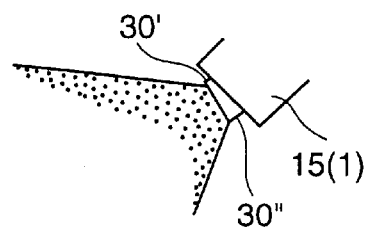
FIG. 6B is a drawing showing a surrounding area of the nozzle part of the injection valve.
Figure 7:
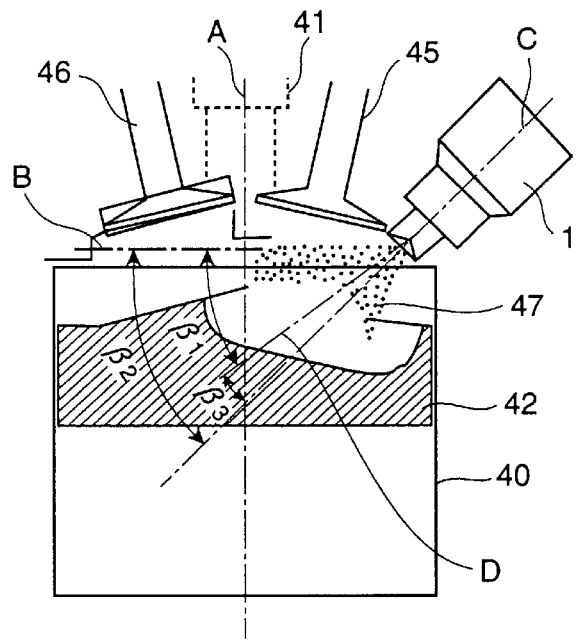
FIG. 7 is an explanatory drawing showing the relation between the target spray direction of the fuel spray and the mount angle of the fuel injection valve used in the above combustion system.

FIGS. 6 and 7 are explanatory drawings showing an example of applying the fuel injection valve in the present invention to the combustion system of the in-cylinder injection type gasoline engine, as shown in a partial cross-section view of the cylinder.

In FIG. 6A, the component 40 is a cylinder, the component 41 is an ignition plug, the component 42 is a piston, the component 43 is an intake gas channel, the component 44 is an exhaust gas channel, the component 45 is an intake valve and the component 46 is an exhaust valve.

In general, the ignition plug 41 is so mounted on the center of the top part (cylinder head) of the cylinder 40 so as to be aligned to the longitudinal axis A of the cylinder, and the intake valve 45 and the exhaust valve 46 are placed on one and the other side individually over the longitudinal axis A.

The fuel injection valve 1 is mounted at the top part of the cylinder and around the marginal part of the cylinder near the intake valve 45 with a designated angle defined-to be slanted to the face B perpendicular to the longitudinal axis A of the cylinder. Thus, the fuel injection valve 1 is mounted with such an angle as the longitudinal axis C of the fuel injection valve body intersects diagonally the longitudinal axis A of the cylinder.

As for the mount layout of the fuel injection valve 1 in the cylinder 40 with the injection port 17 viewed toward the injection direction, the deflected side (for example, the side wall 30a of the injection port 17 located on the right side of the drawing sheet of FIG. 2) is made to face to the ignition plug 41 (upwards), and the non-deflected side (for example, the side wall 3b of the injection port 17 located on the left side of the drawing sheet of FIG. 2) is made to face to the opposite side of the injection plug (downwards).

Owing to the mount layout of the fuel injection valve as described above, the fuel injection valve is so defined that the injection port 17 facing to the inside of the cylinder 40 has a deflection angle α toward the ignition plug side with respect to the longitudinal axis C of the fuel injection valve body by using the above described injection port slant angle α. By way of providing the injection port 17 with a deflection angle α, the fuel spray 47 injected out from the fuel injection valve (in other words, the center line D of the fuel spray) is deflected toward the ignition plug 41 with respect to the longitudinal axis C of the fuel injection valve body. The individual deflection angle of the center line D of the fuel spray and the longitudinal axis E of the injection port is almost identical to each other, and is between 5° and 10°.

The reason why the deflection angle α of the injection port 17 with respect to the longitudinal axis C of the fuel injection valve body is determined to be between 5° and 10° is that the angle β1 for the required spray direction (the angle β3 for the deflected spray) as shown in FIG. 7 can not obtained for the angle lower than 5° due to the restriction on the engine mount angle of the fuel injection valve 1, and that it is difficult to establish the required reachable distance of the fuel spray because the fuel channel loss (pressure loss) in the projection valve becomes larger for the angle larger than 10°.

According to this embodiment, by making the fuel injection port 17 deflected toward the ignition plug 41, the injected fuel spray 47 can be deflected by the angle β3 toward the ignition plug 41 with respect to the longitudinal axis C of the fuel injection valve body as shown in FIG. 7. The angle β3 is an angle defined between the longitudinal axis C of the fuel injection valve body and the center line D of the fuel spray 47.

The parameter β1 in FIG. 7 is an angle for the required target spray direction and defined as an angle between the face B perpendicular the longitudinal axis A of the cylinder and the center line D of the fuel spray. The required spray direction β1 is determined by the shape and size of the engine and is not necessarily a uniform value. The parameter β2 is a mount angle of the fuel injection valve 1 on the engine, and defined as an angle between the reference surface B described above and the longitudinal axis C of the fuel injection valve body.

In case that there is a difference between the angle β1 for the required target spray direction and the mount angle β2 of the fuel injection valve 1, the angle β1 can be established by defining the deflection angle β3 of the fuel spray so as to satisfy the relation β3=β2–β1.

According to the fuel injection valve 1 of this embodiment, the fuel spray 47 is shaped in a cone, and what can be obtained is such a spray shape as the fuel spray 47 is not axial symmetry with respect to the center line D of the spray, the reachable distance L1 (spray penetration) of the spray deflected toward the ignition plug 41 is larger and the reachable distance L2 of the spray at the side (the cavity 42a side of the piston 42) opposite to the deflection side is smaller.

By deflecting the fuel spray toward the ignition plug, what is increased is the degree to which the fuel spray may be concentrated directly around the ignition plug 41 at the stratified combustion mode. Especially as shown in FIG. 6A, the with respect to the vertical surface B perpendicular to the longitudinal axis of the ignition plug (the longitudinal axis of the ignition plug is identical to the longitudinal axis of the cylinder) at a certain position of the injection port of the fuel injection valve 1, by setting the direction of the fuel spray segment 47' of the fuel spray 47 injected at the ignition plug side from the fuel injection valve 1 to be oriented toward the ignition plug 41 rather than the vertical surface B, the fuel spray segment 47' of the fuel spray 47 injected at the ignition plug side is directed directly to the ignition plug 41, and then, an intensive mixed-air formation around the ignition plug 41 is promoted and an ignition performance of the mixed air can be established while an excellent gas mileage is attained.

As the fuel injection at the stratified combustion mode is performed at the compression stroke when the pressure in the engine combustion chamber (in the cylinder) is high, the spread of the fuel spray tends to be small. However ,in this embodiment, for the spray direction of the fuel spray 47, the fuel spray area and the spray angle θ can be extended by the degree for the deflected direction of the spray direction toward the ignition plug 41, and therefore, too much reduction of the spread of the fuel spray can be avoided and hence, a compact spray for concentrating moderately the fuel spray around the ignition plug. The spray angle θ is an angle of the spread of the furl spray on the cross section (plane) when the cross section is defined so as to cut the fuel spray 47 along its center line D. Though the fuel spray is performed at the intake stroke when the pressure is low at the uniform combustion mode, it will be appreciated that the fuel spray area (fuel spray angle θ) can be more extended than ever by the deflection of the spray direction toward the ignition plug, and the uniformity of the fuel spread in the cylinder can be increased.

In addition to the deflected spray toward the ignition plug as described above, by making the reachable distance L1 of the spray deflected toward the ignition plug larger and make the reachable distance L2 of the spray on the opposite side of the deflected spray shorter as shown in FIG. 6A, the distance L1 with its reachable distance longer contributes to the fast component for providing an ignition performance, and the distance L2 with its reachable distance shorter prevents the fuel spray from attaching on the piston head as the length to the cavity 42a of the piston is shorter, and hence contributes to the low velocity component for suppressing the unburned component and reducing the smoke exhaust.

As it is difficult to measure directly this fuel spray formation in the cylinder (combustion chamber) in which the pressure changes to a large extent due to the combustion cycle, various patterns for the fuel spray form are provided and those spray forms of the fuel injection valve are measured under atmospheric pressure before hand, and then, the fuel injection valve is mounted and combustion experiments are performed. In the experiments, in case that the combustion pressure is from 5 Mpa to 9 Mpa, and that the spray deflection angle (deflection angle with respect to the center line C of the fuel injection valve body) is from 5° to 10° (7° for the optimal value) toward the ignition plug, the ratio of the reachable distance L1 of the spray at the deflected side and the reachable distance L2 of the spray at another side opposite to the deflected side, L1/L2, is from 1.1 to 1.4, and the fuel spray angle is from 70° to 90° (85° for the optimal value), the performance stability of the stratified combustion mode and the uniform combustion mode is attained to be high, and at the stratified combustion mode at the idling operation (550 rmp), the combustion is not established for the average A/F=40 without deflected spray, but the combustion is enabled for the average A/F=40 with deflected spray, and the desired conditions that the Cpi (combustion pressure deviation rate)<5% and the smoke (BSU)<0.3 can go together. The average A/F at the stratified combustion mode is an average of A/F for the mixed air layer a concentrated around the ignition plug and A/F for its surrounding air layer b, and in this embodiment, a good conditioned combustion can be realized under such a super lean A/F ratio in which A/F for the mixed air layer a is 15, and A/F for the air layer is 50, and thus, the average A/F is 40.

In the uniform combustion mode, the smoke exhaust can be reduced by ½ to ¼ compared with that by the conventional apparatus while an increase in the output performance can be maintained.

Thus, as a result, an stable engine performance for wider range of engine rotations than in the prior art can be obtained.

In case that the required spray direction of the fuel injection valve and its mount angle are matched each other without deflection of the furl spray, there is no need for spray deflection, but only required is the adjustment in respecting the relation between the reachable distances for fuel sprays, L1 and L2 (L1>L2). That is, in this case, as the angle of the required spray direction β1 and the mount angle of the injection valve β2 has a relation that β1=β2, the fuel spray form is so determined without deflection setting for the fuel spray that the reachable distance L1 of the spray shaped in a cone toward the ignition plug may be larger and the reachable distance L2 of the spray at the opposite side to the ignition plug may be smaller.

Figure 10:
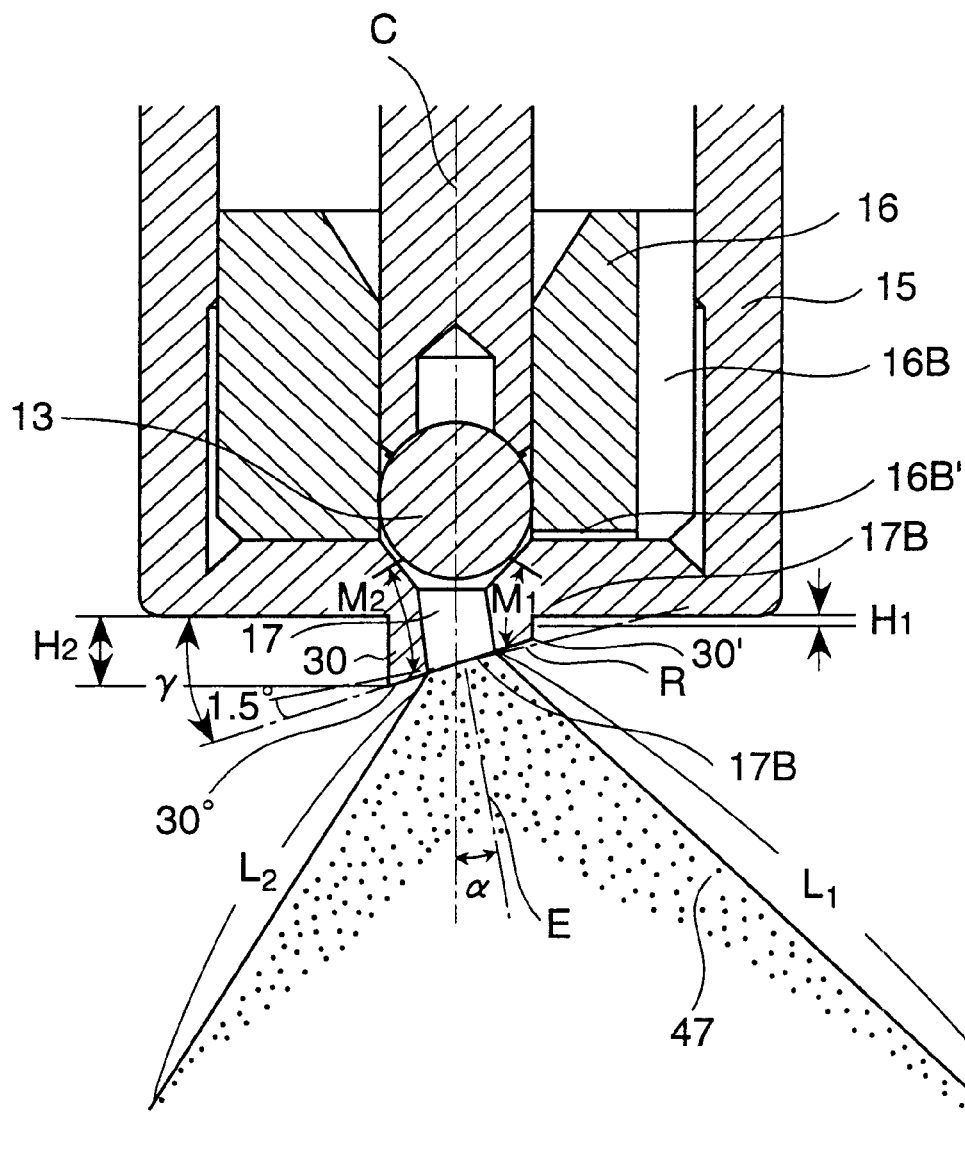
FIG. 10 is an partial cross-section view showing another example of the above nozzle.

Another embodiment of the nozzle 15 in the fuel injection valve is shown in FIG. 10.

In this example, the plane of the outlet 17B of the injection port 17 of the nozzle 15 is slanted with respect to the vertical face R perpendicular to the center line E of the injection port. For example, the angle defined between the face of the outlet 17B of the injection port and the vertical face R is 1.5° (that is, the angle defined between the center line E of the injection port and the face of the outlet 17B of the injection port is, for example, 88.5°, and is determined so as to be 1.5° smaller than the center line E of the injection port and the vertical face R). In case that the angle α defined between the longitudinal axis E of the injection port and the longitudinal axis C of the injection valve body is determined to be 8.5°, the angle γ defined between the face 17B of the outlet of the injection port ad the vertical face of the longitudinal axis C of the injection valve body is 10°.

The height of the small raised part 30 at the upward slant side 30" is, for example, 0.433 mm, and the height at the downward slant side 30' is 0.1 mm.

According to this embodiment, the difference between the channel lengths M1 and M2 of the injection port 17 can be increased (M2>M1) and the arbitrary elliptic shape of the outlet of the injection port 17 and the edge angle of the outlet can be axial asymmetry, and the difference between the reachable distances L1 and L2 of the fuel spray can be provided (L1>L2) owing to those geometrical features. This means that the channel length M of the swirling flow is not identical in the circumferential direction of the injection port, and then, the pressure difference occurs for the wall face difference, and thus, the spray velocity for the longer channel length M2 is slower and the spray velocity for the shorter channel length M1 is faster. This property is increased as the slant angle of the face 17B of the outlet of the injection port is made larger. The larger the slant angle of the face 17B of the outlet of the injection port with respect to the vertical face R of the center line E of the injection port is defined, the higher the more quantity distribution as well as the flow rate (the reachable distance of the spray) for the shorter channel length M1 can be increased. That is, by making the best use of the difference in the channel length M, the spray velocity distribution and spray quantity distribution is provided with directivity, and the shape, flow rate and flow rate distribution can be changed arbitrarily by using this feature.

Figure 11:
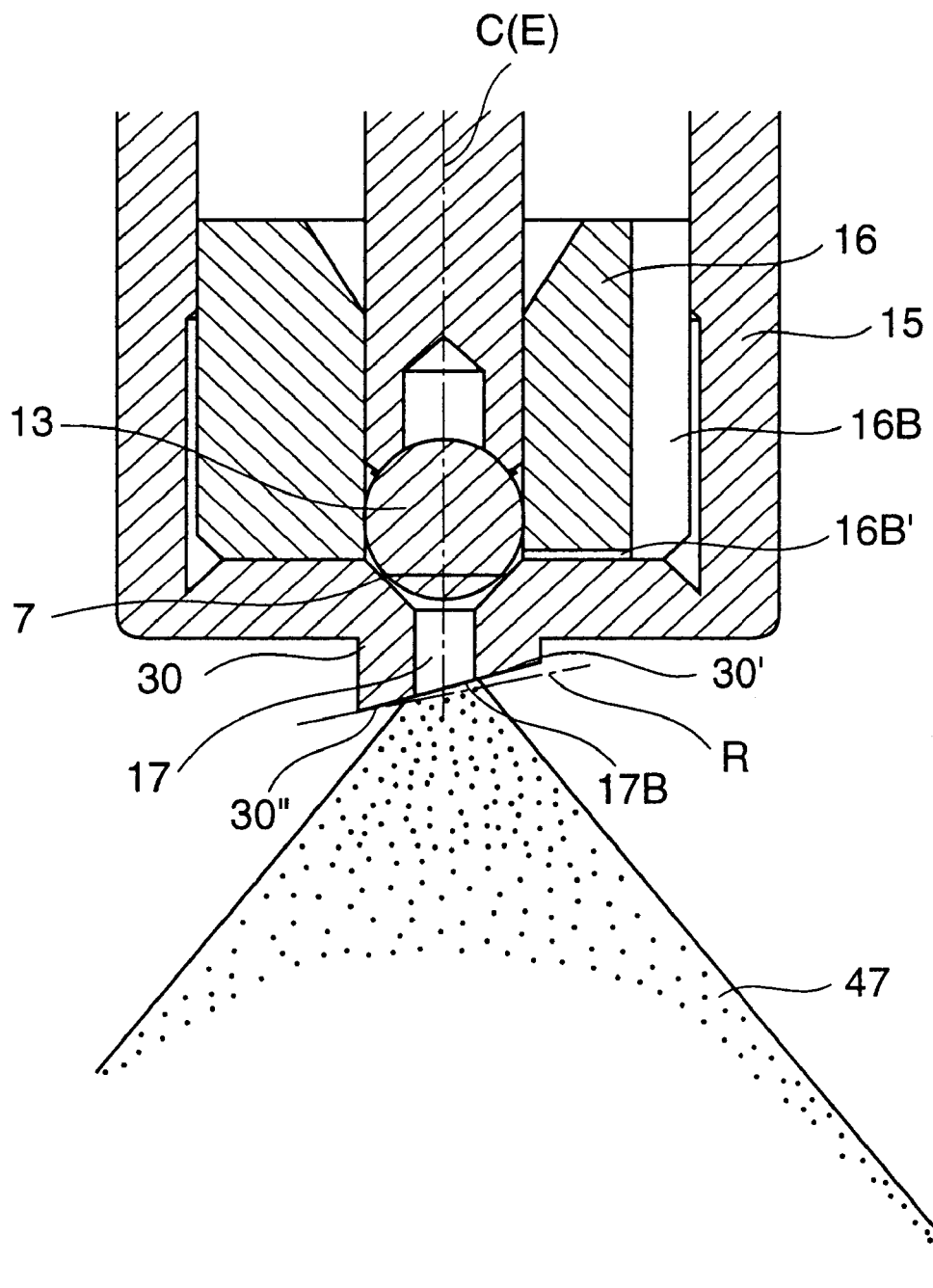
FIG. 11 is an partial cross-section view showing another example of the above nozzle.

Though the face of the outlet 17B of the injection port 17 of the nozzle 15 is slanted with respect to the vertical face R of the center line E of the injection port in the example shown in FIG. 11 similarly to the example shown in FIG. 10, the longitudinal axis E of the injection port 17 is not slanted with respect to the longitudinal axis of the fuel injection valve body C.

Also in this example, the difference between the channel lengths M1 and M2 of the injection port 17 can be increased (M2>M1) and the shape of the outlet of the injection port 17 can be changed, and the edge angle of the outlet can be axial asymmetry, and the difference between the reachable distances L1 and L2 of the fuel spray can be provided (L1>L2) owing to those geometrical features. However, as it is not the case of the deflected spray, it is preferable for the case that the angle of the desired spray direction can be provided only by the mount angle of the fuel injection valve 1.

Figure 12:
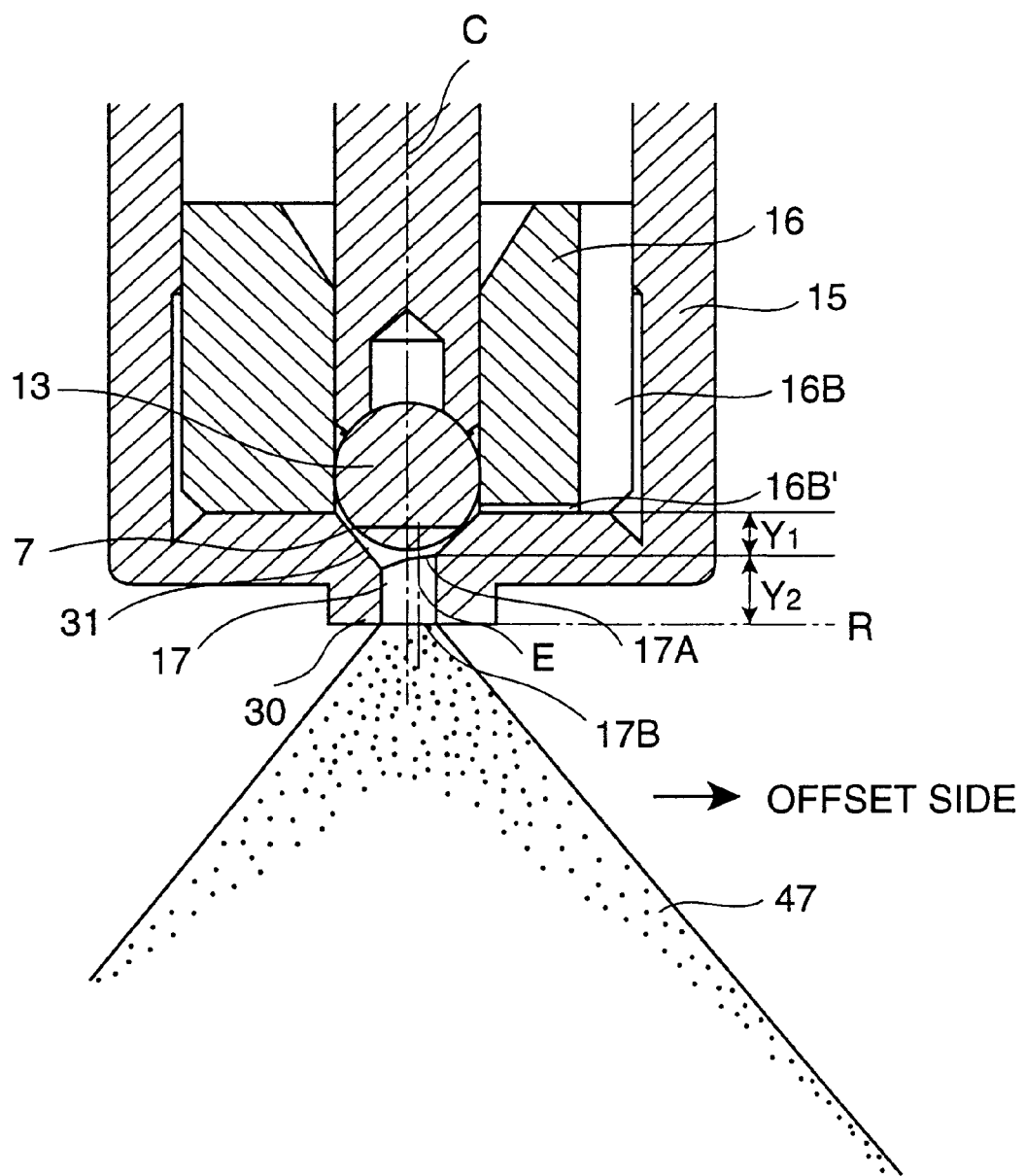
FIG. 12 is a partial cross-section view showing another example of the above nozzle.
Figure 13:
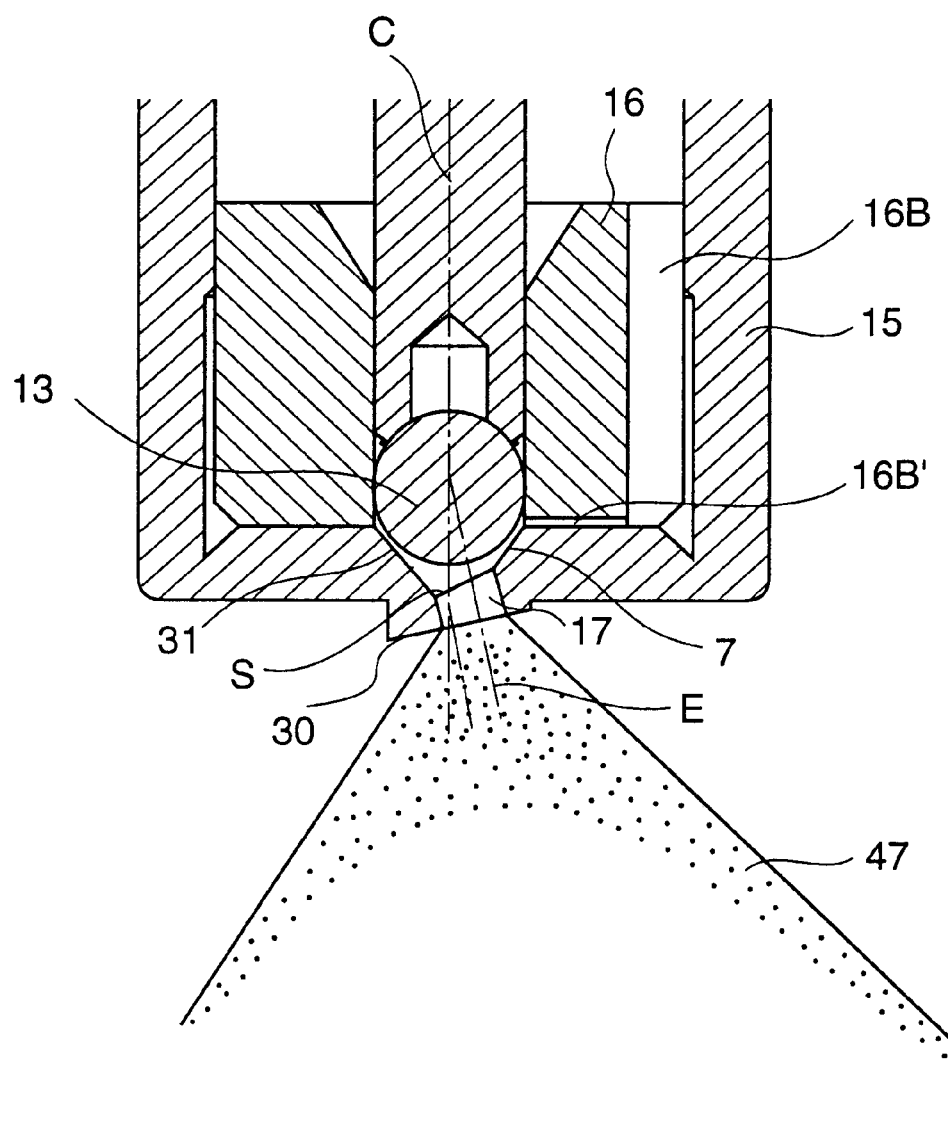
FIG. 13 is a partial cross-section view showing another example of the above nozzle.

The example shown in FIG. 12, in which the nozzle 15 has an orifice used as the injection port 17 similarly as shown in the above described individual embodiments, a reverse-cone shaped hole (fuel swirling space) 13 having a diameter increasing from the inlet 17A position of the injection port 17 toward the upstream and accepting a part of the valve body (ball valve) 13, and having the valve sheet 7, but the following points make distinguished geometrical characteristic.

There is no difference provided in the angle defined between the plane of the outlet 17B of the injection port and the vertical face R of the center line E of the injection port, and the injection port 17 has no slant with respect to the longitudinal axis C of the injection valve body, the top face (the plane of the outlet of the injection port) of the small raised part used as the marginal part of the injection port is also not a slant face but a vertical face with respect to the longitudinal axis C of the injection valve body and the center line EB of the injection port 17.

The injection port 17 is offset with respect to the longitudinal axis C of the injection valve body. With this offset, the injection port 17 is also offset to the center line of the reverse-cone shaped hole 31 and the longitudinal axis of the ball valve 13.

According to such a structure, the inlet 17A of the injection port 17 provides a decline face from the offset side (the right hand side facing to the paper sheet with respect to the longitudinal axis C of the injection valve body in FIG. 12) to the non-offset side (the left hand side facing to the paper sheet with respect to the longitudinal axis C of the injection valve body).

As the swirling fuel flowing out from the fuel channel 16B of the swirler 16 swirls at the axial symmetrical reverse-cone shaped hole on the longitudinal axis of the fuel injection valve body on the channel Y1 from the outlet of the fuel channel 16B' of the swirler 16 to the slant peak edge of the inlet 17A of the injection port, the flow velocity is supposed to be uniform in the circumference direction. On the channel Y2 from the slant peak edge of the inlet 17A of the injection port to the outlet 17B of the injection port, as the injection port 17 is offset with respect to the longitudinal axis C of the injection valve body, the swirling fuel passes through the axial asymmetric channel with respect to the longitudinal axis C of the fuel valve body. According to such a channel for the swirling fuel, the distance from the longitudinal axis C of the swirling fuel to the fuel channel wall at the offset side is long and the distance from the longitudinal axis C of the swirling fuel to the fuel channel wall at the non-offset side is short for the channel Y2. However, As the flow velocity at the outer side in the radial direction of the swirling fuel with respect to the longitudinal axis C of the swirling is faster, there occurs such a flow velocity distribution and flow velocity difference in the swirling fuel that the flow velocity along the fuel channel wall at the offset side is high and the flow velocity along the fuel channel wall at the non-offset side is low. That is, by means that the swirling fuel channel Y2 is made offset with respect to the center C of the swirling fuel, such a flow velocity distribution as the flow velocity difference occurs as described above. As a result, for the swirling fuel spray (cone-shaped spray) injected out from the injection port 17, the flow velocity (spray reachable distance) and flow rate can be made higher at the offset side rather than at the non-offset side.

Thus, a desired spray shape, flow velocity and flow rate distribution can be obtained by setting the offset value in responsive to the swirling force of the swirling fuel and setting the adequate length and diameter of the injection port.

FIG. 3A shows an example of applying the offset of the injection port shown in FIG. 12 to the injection port having a deflection angle.

A valve sheet 7, an injection port 17 located at the down stream of the valve sheet and a fuel swirling space S (reverse-cone shaped hole 31) located between the injection port 17 and the valve sheet 7 are formed at the nozzle 15. The injection port 17 has a slant with respect to the longitudinal axis C of the fuel injection valve body, and the fuel swirling space S is defined so as to be axial symmetry with respect to the longitudinal axis C of the fuel injection valve body, and the center of the inlet 17A of the injection is offset with respect to the longitudinal axis C of the fuel injection valve body. The deflection direction of the injection port 17 is positioned at the offset direction in viewing the outlet 17B of the injection port.

In this example, as deflecting the fuel spray, the spray flow velocity (spray reachable distance) in the deflection direction and the flow rate can be made larger than those in the non-deflection direction.

In case that the injection port 17 is deflected as described above, it is allowed to change the shape of the inlet 17A of the injection port in responsive to the degree of deflection, and the spray distribution tends to be deflected, and a desired spray shape, flow velocity and flow rate distribution can be obtained by means that this tendency can be increased or decreased by making the inlet 17A of the injection port offset to the center C of the swirling.

Figure 14:
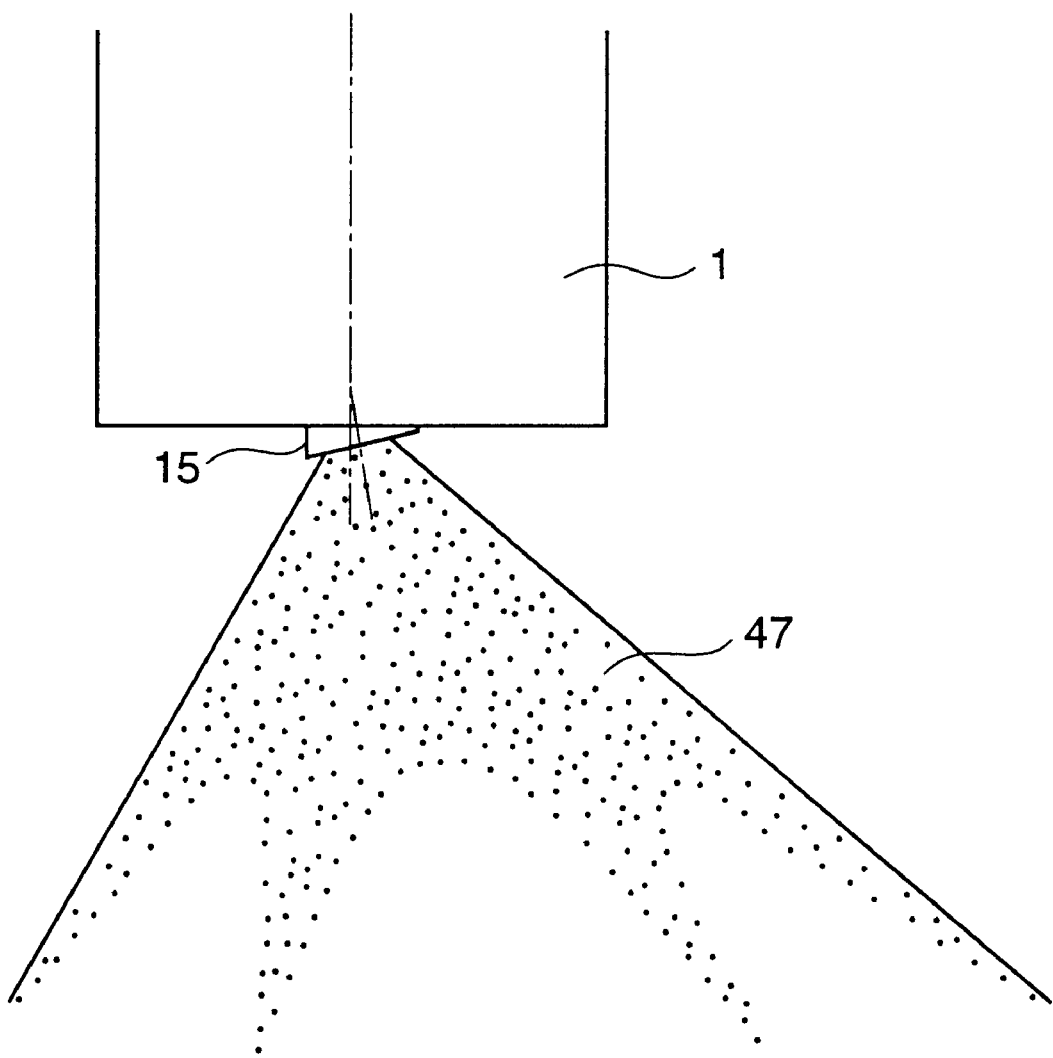
FIG. 14 is an explanatory drawing showing another example of the spray state of the nozzle.
Figure 15:
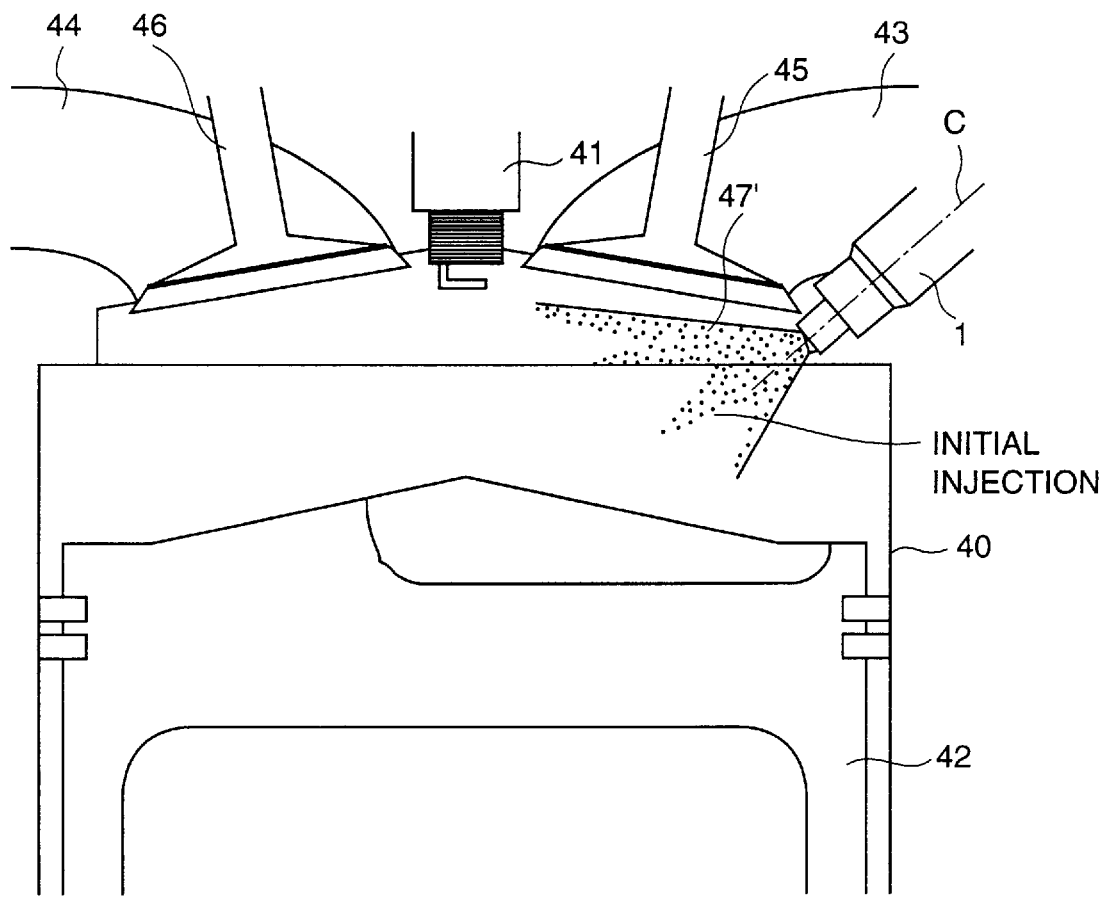
FIG. 15 is an explanatory drawing showing another example of the in-cylinder injection type gasoline engine.

FIG. 14 shows a modification example of the fuel injection valve having a deflected injection port described above in which the inner structure of the fuel injection valve 1 is not shown. For example, the width of the outlet of the fuel channel 16B' of the swirler shown in FIG. 2 is made to be wider than the channel 16B' itself, and the space for holding the fuel is provided by this enlarged space. With this structure, the fuel staying in the fuel holder is also injected together at the initial phase of injecting the fuel spray, but as the fuel in the fuel holder does not have a swirling force, this fuel is formed as a spray form to be injected inside the swirling fuel to follow. This is used for the case of requiring such a spray form, a combustion system of the in-cylinder injection type gasoline engine using such a spray form is shown in FIG. 15.

Figure 16:
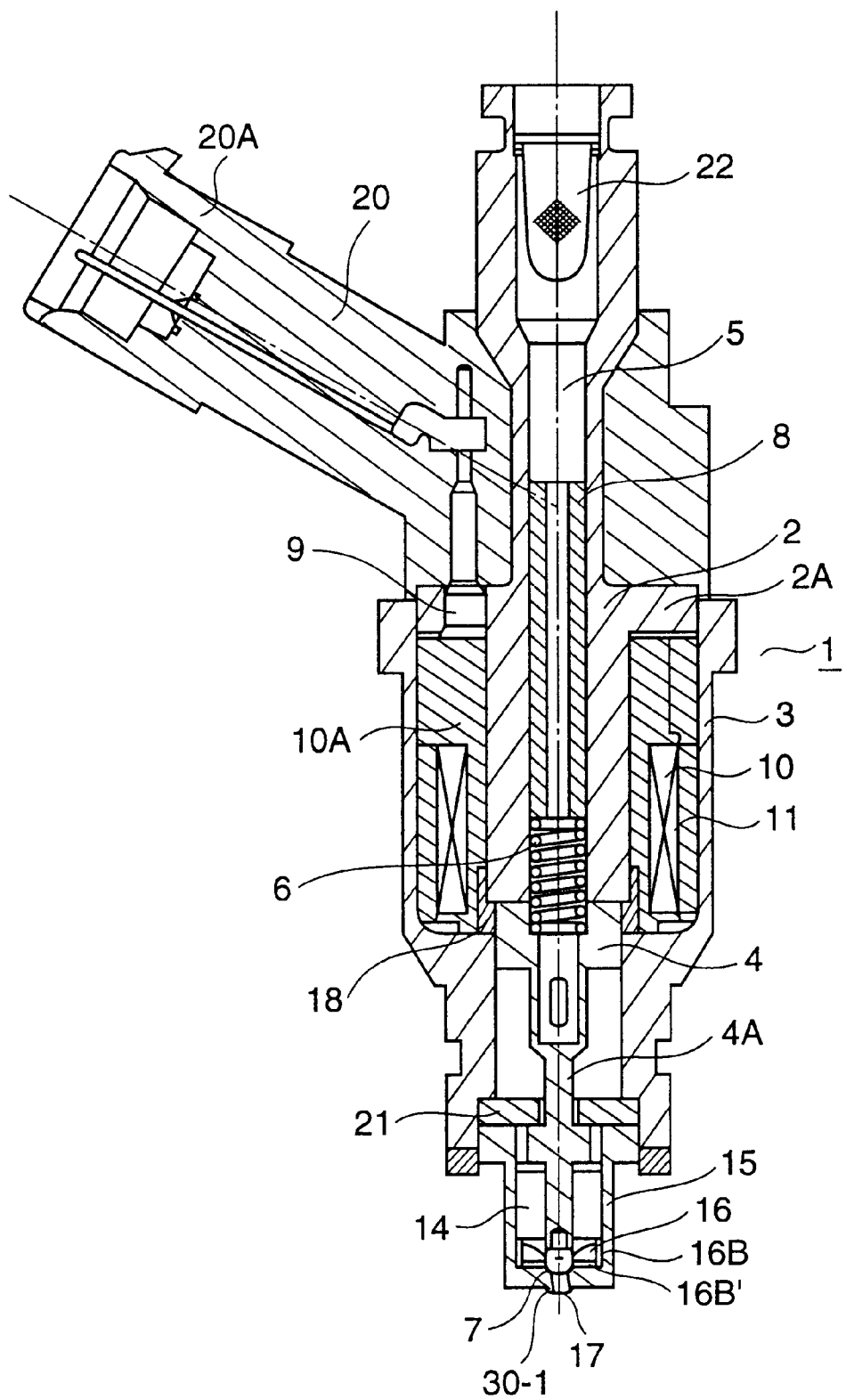
FIG. 16 is a vertical cross-section view showing another example of the fuel injection valve.
Figure 17A:
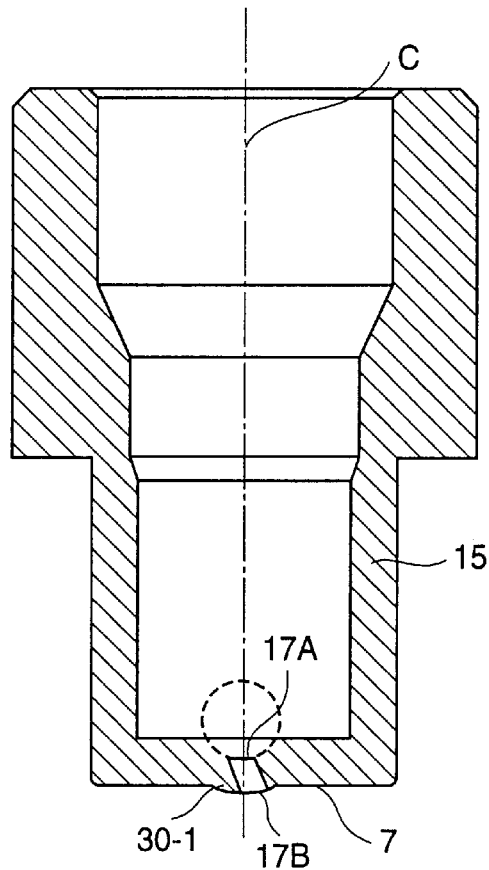
FIG. 17A is a vertical cross-section view showing a single body itself of the nozzle used in the above fuel injection valve shown in FIG. 16.
Figure 17B:
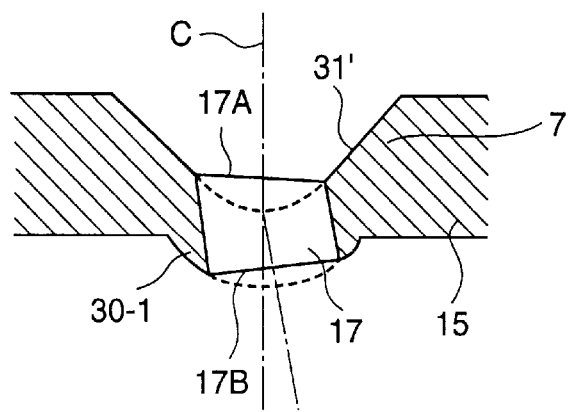
FIG. 17B is its magnified cross-section view.

FIG. 16 is a overall structure diagram showing another embodiment of the fuel injection valve of the present invention, FIG. 17A is a vertical cross-section view showing the overall configuration of the nozzle used for the fuel injection valve, and FIG. 17B is a partial magnified cross-section view showing the surrounding area of the injection port.

The fuel injection valve in this example is also aimed to define the similar deflected spray to that shown in FIG. 3A and the spray reachable distance so as to satisfy the relation L1>L2. In the following, the different structures from those in the fuel injection valve shown in FIG. 3A are described.

In this embodiment, as shown in FIG. 17A, a concave portion 31' shaped in a reverse-cone and having a curved surface on its top of the reverse-cone is formed on the inner surface by press work, and a valve sheet 7 is formed on the surface of the concave portion 31'. A semispherical small raised part 30 is formed by press work at the central part of the outer surface of the body top of the nozzle 15, and a fuel injection port 17 is formed at the thick part of the small raised part 30-1 so as to be slanted with respect to the longitudinal axis (nozzle axis) C of the fuel injection valve body.

Also in this embodiment, the distance from the valve body contact position of the valve sheet to the outlet 17B of the injection port 17 (swirling fuel channel length) at the deflection side in viewing the injection port from the valve sheet can be shorter and the distance at the non-deflection side can be longer, and by making the edge angle of the inlet 17A and outlet 17B of the injection port 17 axial asymmetry, the reachable distance of the spray at the deflection side can be longer than that at the non-deflection side, and by adjusting arbitrarily the deflection angle of the injection port, a desired shape, flow velocity and spray distribution for the fuel spray can be obtained.

In the present invention, there is such an advantage as a fuel injection port can be easily formed inside the small raised part 30-1 by press work and boring work for the injection port.

According to the present invention, by applying the invention to in-cylinder injection type gasoline engines, optimal fuel spray forms individually optimum for the stratified combustion mode and the uniform combustion mode can be formed with a single fuel injection valve, and gasoline mileage and output power can be increased and a stable engine performance can be obtained in a wide range of engine rotation.

What is claimed is:

1. A fuel injection valve for an in-cylinder injection type engine having a fuel swirling means for giving a swirling force at an upper stream of a valve seat to a fuel passing through a surrounding area of a valve body and a nozzle injecting a swirling fuel, wherein a fuel spray injected out from an injection port of said nozzle is so formed that an orientation of said fuel spray is deflected in a definite direction on a basis of a longitudinal axis of a fuel injection valve body, a reachable distance of said fuel spray at another side opposite to a deflected side is shorter, wherein measured under atmospheric pressure, a spray deflection angle with respect to a center line C of said fuel injection valve body is from 5° to 10°, a ratio of a reachable distance L1 of a spray at the deflected side and a reachable distance L2 of a spray at another side opposite to the deflected side, L1/L2, is from 1.1 to 1.4, and a fuel spray angle is from 70° to 90°.

2. A fuel injection valve, a fuel injection valve for an in-cylinder injection type engine having a fuel swirling means for giving a swirling force at an upper stream of a valve seat to a fuel passing through a surrounding area of a valve body and a nozzle injecting a swirling fuel, wherein a fuel spray injected out from an injection port of said nozzle is so formed that an orientation of said fuel spray is deflected in a definite direction on a basis of a longitudinal axis of a fuel injection valve body, a reachable distance of said fuel spray at another side opposite to a deflected side is shorter wherein assuming that a length of said injection port is defined as 1 and a diameter of said injection port is defined as d, those parameters are determined so as to satisfy a relational expression $0.3 < 1/d < 1.3$.

3. A fuel injection valve for an in-cylinder injection type engine having a fuel swirling means for giving a swirling force at an upper stream of a valve seat to a fuel passing through a surrounding area of a valve body and a nozzle injecting a swirling fuel, wherein assuming that a top of said valve body contacting said valve sheet when a valve is closed faces to an inlet of said injection port down stream of the valve seat, and that a distance from a position at which said valve body contacts said valve seat to an inlet of said injection port is defined as y, and a distance from a position at which said valve contacts said value seat to an inlet of said injection port and the top of said value body is defined as z, and a required condition is $y \leq 2z$.

4. A fuel injection valve for an in-cylinder injection type engine having a fuel swirling means for giving a swirling force at an upper stream of a valve seat to a fuel passing through a surrounding area of a valve body and a nozzle injecting a swirling fuel, wherein said nozzle is formed with an orifice used as an injection port located at a center of a bottom part of a body having a bottom and shaped in a hollow cylinder and with a valve seat located at an upper stream of said orifice, said fuel swirling means has a guide hole for said valve body at its center and is composed of a chip having an eccentric fuel channel at its outer face and bottom face, said chip is supported by an inner bottom of said nozzle and inserted into said nozzle, a diameter of an inner surface of said nozzle is enlarged at a region from a corner intersecting an inner bottom face of said nozzle to an inside perimeter position intersecting a vertical face of a chip axis at a middle position in a height of said chip, and a hollow is formed at a corner intersecting an inner bottom face of said nozzle positioned below a face accepting a chip of an nozzle inner bottom in a region of said inner enlarged perimeter.

* * * * *